US012711034B2

(12) United States Patent
Sood et al.

(10) Patent No.: US 12,711,034 B2
(45) Date of Patent: Aug. 18, 2026

(54) SYSTEM AND METHOD FOR IDENTIFYING PERFORMANCE OR PRODUCTIVITY DEGRADATION IN DEVICES WHEN APPLICATION PROFILES OF DEVICES ARE CHANGED IN A LOGICAL GROUP

(71) Applicant: ZEBRA TECHNOLOGIES CORPORATION, Lincolnshire, IL (US)

(72) Inventors: Ajay Sood, Bangalore (IN); Santanak R. Chowdhury, Kolkata (IN); Sonia B. Thomas, Bangalore (IN); Charles W. Roark, Frisco, TX (US); Amrit Goyal, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 814 days.

(21) Appl. No.: 18/080,667

(22) Filed: Dec. 13, 2022

(65) Prior Publication Data

US 2024/0193066 A1 Jun. 13, 2024

(51) Int. Cl.
*G06F 11/34* (2006.01)
*G06N 20/00* (2019.01)

(52) U.S. Cl.
CPC ......... *G06F 11/3409* (2013.01); *G06N 20/00* (2019.01)

(58) Field of Classification Search
None
See application file for complete search history.

(56) References Cited

U.S. PATENT DOCUMENTS 10,613,897 B1 4/2020 Wang et al.
2015/0381409 A1* 12/2015 Margalit ............. H04L 41/0631 709/221
2017/0257303 A1 9/2017 Boyapalle et al.

FOREIGN PATENT DOCUMENTS

WO 2022047204 A1 3/2022

OTHER PUBLICATIONS

International Search Report and Written Opinion for International Application No. PCT/US2023/82064 mailed on Mar. 12, 2024.

* cited by examiner

*Primary Examiner* — Walter L Lindsay, Jr.
*Assistant Examiner* — Geoffrey T Evans

(57) ABSTRACT

An AI-based recommendation and alerting system and method for identifying performance or productivity degradation in devices when application profiles are changed in a logical group based on business function, site, or an organization are disclosed herein. An example method includes receiving indications of instances of performance degradation associated with devices; determining application profile changes associated with the devices, having occurred prior to the instances of performance degradation; determining a likelihood that the application profile changes are related to the instances of performance degradation associated with the devices by applying a machine learning model executing on to the indications of instances of performance degradation associated with the devices and the application profile changes associated with the one or more devices; and identifying fixes to the application profiles associated with the devices that may be applied to mitigate the instances of performance degradation associated with the devices.

42 Claims, 11 Drawing Sheets

SYSTEM AND METHOD FOR IDENTIFYING PERFORMANCE OR PRODUCTIVITY DEGRADATION IN DEVICES WHEN APPLICATION PROFILES OF DEVICES ARE CHANGED IN A LOGICAL GROUP

BACKGROUND

New applications or application versions are regularly developed and deployed to devices used by organizations. When devices are repaired, applications may go missing. Moreover, there are situations when different devices run different versions of the same application. Consequently, changes to devices' application profiles (e.g., the list of applications loaded on the device which may be identified with application names, versions and package names) may occur during a new application rollout on a set of devices, during an application version upgrade/downgrade across a set of devices, when applications are uninstalled from a set of devices during repairs, and/or when users of the devices install additional applications on their own devices.

SUMMARY

In an embodiment, the present invention is a method, comprising: receiving, by one or more processors, indications of one or more instances of performance degradation associated with one or more devices; determining, by the one or more processors, one or more application profile changes associated with the one or more devices, the one or more application profile changes having occurred prior to the one or more instances of performance degradation; determining, by the one or more processors, a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identifying, by the one or more processors, one or more fixes to the application profiles associated with the one or more devices that may be applied to mitigate the one or more instances of performance degradation associated with the one or more devices.

In a variation of this embodiment, the machine learning model is a statistical model.

Furthermore, in a variation of this embodiment, the machine learning model is a Monte Carlo model.

Additionally, in a variation of this embodiment, the machine learning model is a supervised model.

Moreover, in a variation of this embodiment, the machine learning model is an unsupervised model.

Additionally, in a variation of this embodiment, the method further includes: training, by the one or more processors, the model to determine a likelihood that one or more of the application profile changes associated with the one or more devices are related to the one or more instances of performance degradation associated with the one or more devices based on the received instances of performance degradation associated with the one or more devices, and the determined one or more application profile changes associated with the one or more devices.

Moreover, in a variation of this embodiment, the model may be trained by analyzing training data including historical application profile changes associated with historical devices, historical instances of performance degradation associated with the historical devices, historical fixes applied to the historical devices, and historical rates of success associated with the historical fixes applied to the historical devices, in order to identify one or more fixes to the application profiles associated with the one or more devices that may be applied in order to mitigate the one or more instances of performance degradation associated with the one or more devices.

Furthermore, in a variation of this embodiment, identifying, by the one or more processors, the one or more fixes to the application profiles associated with the one or more devices that may be applied to mitigate the one or more instances of performance degradation associated with the one or more devices may include applying the model executing on the one or more processors in order to identify the one or more fixes to the application profiles associated with the one or more devices that may be applied to mitigate the one or more instances of performance degradation associated with the one or more devices.

Additionally, in a variation of this embodiment, the model may be trained by analyzing training data including historical device log data associated with historical devices and historical instances of performance degradation associated with the historical devices, in order to identify one or more instance of performance degradation associated with one or more devices based on device data associated with the one or more device.

Moreover, in a variation of this embodiment, the method further includes: applying, by the one or more processors, the one or more identified fixes to the application profiles associated with the one or more devices to mitigate the one or more instances of performance degradation associated with the one or more devices.

Furthermore, in a variation of this embodiment, the one or more instances of performance degradation include one or more of: (i) excessive or premature battery depletion associated with the device or associated with particular applications of the device; (ii) frequent battery changes associated with the device; (iii) the device being reported to a repair center; (iv) the device returning an application error; (vi) an application of the device not responding to user requests; (vii) scan failures associated with the device; (viii) excessive network usage associated with the device or associated with particular applications of the device; (ix) excessive memory usage associated with the device or associated with particular applications of the device; (x) excessive user-generated reboots associated with the device; (xi) excessive system-generated reboots associated with the device; (xii) excessive processor utilization associated with the device; or (xiii) excessive processor utilization associated with one or more applications of the device.

Additionally, in a variation of this embodiment, the one or more application profile changes include one or more of: (i) installing an application on the device; (ii) uninstalling an application from the device; (iii) disabling an application of the device; or (iv) installing a particular update of an application of the device.

Moreover, in a variation of this embodiment, the one or more identified fixes to the application profiles associated with the one or more devices that may be applied to mitigate the one or more instances of performance degradation associated with the one or more devices include one or more of: (i) uninstalling an application that was installed on the device during the one or more application profile changes; (ii) installing an application that was uninstalled from the device during the one or more application profile changes;

(iii) disabling an application that was installed on the device during the one or more application profile changes; (iv) installing a particular update of an application installed on the device during the one or more application profile changes; or (v) reverting an application installed on the device during the one or more application profile changes to a previous version.

Furthermore, in a variation of this embodiment, the one or more fixes to the application profiles associated with the one or more devices that may be applied to mitigate the one or more instances of performance degradation associated with the one or more devices are identified based at least in part on whether the one or more application profile changes relate to an essential application or a non-essential application.

Additionally, in a variation of this embodiment, the method further includes determining, by the one or more processors, whether the one or more application profile changes relate to an essential application or a non-essential application by analyzing descriptions of the application from an application store using one or more semantic rules or keyword searches.

Moreover, in a variation of this embodiment, the one or more devices are each included in a logical group based one or more of: a product type associated with the one or more devices, a function associated with the one or more devices or users thereof, a location site, or group of sites, associated with the one or more devices or users thereof, a number of devices at a location site associated with the one or more devices, a business function associated with the one or more devices within a location site, or an organization associated with the one or more devices or users thereof.

In another embodiment, the present invention is a system, comprising: one or more processors, and a memory storing computer-readable instructions that, when executed by the one or more processors, cause the one or more processors to: receive indications of one or more instances of performance degradation associated with one or more devices; determine one or more application profile changes associated with the one or more devices, the one or more application profile changes having occurred prior to the one or more instances of performance degradation; determine a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identify one or more fixes to the application profiles associated with the one or more devices that may be applied to mitigate the one or more instances of performance degradation associated with the one or more devices.

In yet another embodiment, the present invention is a non-transitory, computer-readable medium storing instructions that, when executed by one or more processors, cause the one or more processors to: receive indications of one or more instances of performance degradation associated with one or more devices; determine one or more application profile changes associated with the one or more devices, the one or more application profile changes having occurred prior to the one or more instances of performance degradation; determine a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identify one or more fixes to the application profiles associated with the one or more devices that may be applied to mitigate the one or more instances of performance degradation associated with the one or more devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
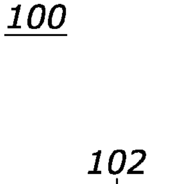
FIG. 1 is a block diagram of an example system for diagnosing instances of performance degradation related to application profile changes for devices in a logical group, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Overview

As discussed above, new applications or application versions are regularly developed and deployed in organizations. When devices are repaired, applications may go missing. Moreover, there are situations when different devices run different versions of the same application. Consequently, application profile changes may occur during a new application rollout on a set of devices, during an application version upgrade/downgrade across a set of devices, when applications are uninstalled from a set of devices during repairs, and/or when users of the devices install additional applications on their own devices.

These application profile changes on a fleet of devices may result in higher battery drain. This can lead to a device utilized by a worker failing to last the worker's entire shift without disruption or loss of productivity for the worker (retail, transport and logistics, manufacturing, healthcare, etc.). For instance, a shift could be 8 hours for a retail store worker or it could be longer (up to 14 hours) for a transport and logistics worker as they might have a large number of deliveries during the course of the day. These application profile changes on a fleet of devices may also impact device inventory, e.g., by too many devices being out of operation.

Furthermore, these application profile changes can cause device health degradation and impact user productivity. For instance, a device having missing applications, or incorrect versions of applications installed may be reported to a repair center, leading to a loss of productivity. As another example, these application profile changes can result in application errors, such as Application Not Responding events (ANRs), which may impact the user's performance doing work tasks. As still another example, these application profile changes can result in a new application version being rolled out with coding that leads to steep discharges on the device battery, and thus batteries not lasting the shift and, over time, reducing the useful lifetime of the battery. Additionally, as another example, these application profile changes can result in excessive (e.g., higher than expected) network usage leading to WLAN or WWAN network issues, or lower than expected network usage indicating possible issues with the application. These application profile changes can also result in excessive memory usage on the devices.

The present disclosure provides techniques for determining and correlating whether changes in the application profile leads to performance degradation for a group of devices and impacts the device health of that group. Based on this determination, an appropriate recommendation can be raised to correct the application profile, and the recommended steps may be automatically taken by a device or group of devices. Advantageously, correcting the application profile may result in a reduction of incident tickets sent to information technology (IT) or other support groups and a reduction in device downtime, as well as increased productivity once the application profile is corrected.

In particular, a model (which may be a machine learning model) may be trained to identify or predict a likelihood that changes in the application profile of a given device or a group of devices lead to performance degradation for the given device or group of devices. Moreover, the model (or another model, which may be another machine learning model) may be trained to identify or predict steps that may be taken to mitigate the performance degradation for the given device or group of devices.

Furthermore, the present disclosure provides techniques for comparing the application profiles of groups of devices to determine whether certain devices can perform similar functions as other devices. Additionally, the present disclosure provides techniques for classifying applications as essential and non-essential, e.g., to determine whether an application associated with a profile change that led to performance degradation for one or more devices needs to be fixed, or whether the application can be uninstalled from the devices.

Example System

FIG. 1 illustrates an example system 100 for diagnosing instances of performance degradation related to application profile changes for devices in a logical group. In the illustrated example, the system 100 includes a server device 102, which may communicate with devices 104 via a network 106 (and/or via a wired interface, not shown). The devices 104 may be mobile computing devices, such as, e.g., smart phones, smart watches, tablets, and laptop computers, as well as specialized mobile computing devices such as bar code readers, QR-code scanners, RFID readers, etc. Generally speaking, each of the devices 104 may include a network interface (not shown) that represents any suitable type of communication interface(s) (e.g., wired interfaces such as Ethernet or USB, and/or any suitable wireless interfaces) configured to operate in accordance with any suitable protocol(s) for communicating with the server 102 over the network 106.

The server 102 may include one or more processors 108, which may be, for example, one or more microprocessors, controllers, and/or any suitable type of processors, and a memory 110 accessible by the one or more processors 108 (e.g., via a memory controller). An example processor 108 may interact with the memory 110 to obtain, for example, machine-readable instructions stored in the memory 110 corresponding to, for example, the operations represented by the flowcharts of this disclosure, including those of FIGS. 2-11. For instance, the instructions stored in the memory 110, when executed by the processor 110, may cause the processor 108 to execute various applications stored in the memory 110, such as a performance degradation diagnostic application 112, a performance degradation diagnostic machine learning model training application 114, and a performance degradation diagnostic machine learning model 116.

Executing the performance degradation diagnostic application 112 may include receiving or otherwise obtaining/accessing indications of instances of performance degradation associated with the devices 104 of a logical group. Device(s) 104 may be grouped into a logical group based on one or more of: a product type associated with the one or more devices, a function associated with the one or more devices or users thereof, a location site, or group of sites, associated with the one or more devices or users thereof, a number of devices at a location site associated with the one or more devices, a business function associated with the one or more devices within a location site, an organization associated with the one or more devices or users thereof, or a combination of any of the above. In some examples, the server device 102 may receive indications of instances of performance degradation directly from the devices 104, e.g., via the network 106. Moreover, in some examples, the server device 102 may store (e.g., on the memory 110) or may otherwise be configured to access a database 118 including indications of instances of performance degradation associated with the devices 104. For instance, the database 118 may be populated by the server device 102, by the devices 104, or by another device (not shown) in communication with the devices 104. For instance, the devices 104 may detect or report such instances of performance degradation to the server device 102 or to another computing device, and the indications of the instances of performance degradation may be added to the database 118.

Moreover, in some examples, the devices 104 may send various usage data to the server device 102, or to the database 118, and the performance degradation diagnostic application 112 may analyze the usage data to identify instances of performance degradation associated with the devices 104. For instance, the usage data may include application usage data, indications of applications installed on the device, battery usage data, memory usage data, scan usage data, and wireless usage data. The performance degradation diagnostic application 112 may analyze this usage data, sometimes in conjunction with additional log data, to identify instances of performance degradation associated with the devices 104. For instance, the additional log data may include device logs, as well as support logs or device repair logs, including indications of dates/times associated with scans, battery charging, battery swaps, shift start and end times for workers who use the devices 104, start and end times for application rollout, reboot events, application errors, other internet of things (IOT) data etc.

Some examples of instances of performance degradation associated with the one or more devices 104 may include excessive (e.g., greater than a threshold amount) or premature (e.g., occurring prior to a threshold amount of time) battery depletion associated with the device(s) 104 or associated with particular applications of the device(s) 104; frequent (e.g., greater than a threshold amount) battery changes associated with the device(s) 104; device(s) 104 being reported to a repair center; device(s) 104 returning an application error; an application of the device(s) 104 not responding to user requests; scan failures associated with the device(s) 104 (e.g., in the case that the devices are barcode scanners, QR-code scanners, RFID scanners, or other types of scanners or readers); excessive (e.g., greater than a threshold amount) network usage associated with the device(s) 104 or associated with particular applications of the device(s) 104; excessive (e.g., greater than a threshold amount) memory usage associated with the device(s) 104 or associated with particular applications of the device(s) 104; excessive (e.g., greater than a threshold amount) user-generated reboots associated with the device(s) 104; excessive (e.g., greater than a threshold amount) system-generated reboots associated with the device(s) 104; excessive (e.g., greater than a threshold amount) processor utilization associated with the device(s) 104; excessive (e.g., greater than a threshold amount) processor utilization associated with one or more applications of the device(s) 104; or any combination of any of the above.

In some examples, the performance degradation diagnostic application 112 may determine the threshold amounts discussed above with respect to instances of performance degradation based on applying a model (e.g., a statistical model, a machine learning model, etc.) to the historical usage data, log data, etc., associated with devices 104 generally or associated with devices 104 of a particular logical group. For instance, a machine learning model (e.g., the model 116, or additional models) may be trained to identify a typical number of battery swaps across devices 104 in a logical group, as discussed below with respect to FIG. 3, typical discharge rates across devices 104 in a logical group, as discussed below with respect to FIG. 4, a typical number of ANRs (or other device errors) across devices 104 in a logical group, as discussed below with respect to FIG. 6, typical applications or typical application versions installed on the devices 104 in the logical group, as discussed with below with respect to FIGS. 8 and 10, missing applications that should be running on devices 104 in the logical group, extra applications that may impact performance of devices 104 in the logical group, or other compliance issues.

Each indication of an instance of performance degradation stored in the database 118 may include an indication of a date and/or time at which the instance was detected or reported by the device(s) 104, as well as indications of device characteristics associated with the device(s) 104 experiencing the instance of performance degradation, indications of recent application profile changes associated with the device(s) 104 experiencing the instance of performance degradation, logical groups of which the device(s) 104 experiencing the instance of performance degradation are a part, etc.

An example log of data that may be stored in the database 118 is illustrated below in Table 1. As shown at Table 1, for each device for which an issue is raised, the serial number of the device, the model number of the device, the date at which the issue is raised, the application name, and the version number may be logged.

TABLE 1

| Serial Number | Model | Raised Date | Application Name | Version |
|---|---|---|---|---|
| XXxxxxxxxx318 | XX72 | Apr. 20, 2022 | Settings | 10 |
| XXxxxxxxxx542 | XX75x | Apr. 20, 2022 | External Storage | 7.1.2 |
| XXxxxxxxxx927 | XX70x | Apr. 19, 2022 | Messaging | 8.1.0 |
| XXxxxxxxxx413 | XX70x | Apr. 20, 2022 | RFID Print | 3.0.11 |

TABLE 1-continued

| Serial Number | Model | Raised Date | Application Name | Version |
|---|---|---|---|---|
| XXxxxxxxxx788 | XX70x | Apr. 20, 2022 | Google Services Framework | 8.1.0-6477825 |
| XXxxxxxxxx576 | XX70x | Apr. 20, 2022 | Work profile setup | 8.1.0 |

Moreover, in some examples, the performance degradation diagnostic application 112 may analyze health factors associated with a device 104 to generate a device health score related to application health, battery health, performance health, memory health and memory utilization, repair history, wireless connectivity health, etc. Additionally, the performance degradation diagnostic application 112 may generate a device application health score indicating the suitability of a given application profile on one of the devices 104 to perform certain desired actions. The device application health score may be generated based on a weighted average of scores of various contributing factors to provide a measure of device application health for a device 104. These factors may include, for instance, the indications of performance degradation discussed above, as well as factors such as whether an essential application is missing from a device 104, whether a non-essential application is being used extensively on the device 104, whether an application version on a device 104 (or logical group of devices 104) is different from the most common or desired version of the application. Furthermore, in some examples, the performance degradation diagnostic application 112 may generate a device application health score for a logical group of devices 104. In some examples, the performance degradation diagnostic application 112 may determine that there are one or more instances of performance degradation associated with a device 104 or a logical group of devices 104 based on the device application health score for the device 104 or logical group of devices 104, e.g., based on the device application health score for the device 104 or logical group of devices 104 falling below a threshold score.

Executing the performance degradation diagnostic application 112 may further include determining instances of application profile changes associated with the device(s) 104 experiencing instances of performance degradation, and occurring prior to the instances of performance degradation. For instance, some examples of application profile changes may include, but are not limited to: installing an application on the device(s) 104; uninstalling an application from the device(s) 104; disabling an application of the device(s) 104; installing a particular update of an application of the device (s) 104; or any combination of any of the above. For instance, these various application profile changes may affect the device health score associated with the device(s) 104 by causing excessive battery discharge, increasing the need to swap out batteries more frequently (e.g., because of the excessive battery discharge), increasing the amount of memory needed and resulting in excessive (e.g., greater than a threshold) low memory events, increasing network usage leading to slow connections for the device and/or excessive time outs, and/or an increase in scan failure rates due to application errors.

In some examples, the performance degradation diagnostic application 112 may determine the instances of application profile changes associated with the device(s) 104 experiencing instances of performance degradation by accessing the database 118, and/or by accessing another database storing indications of instances of application profile changes associated with various device(s) 104. Additionally, in some examples, the performance degradation diagnostic application 112 may determine the instances of application profile changes associated with the device(s) 104 experiencing instances of performance degradation by receiving, or otherwise obtaining or accessing, a log indicating dates and times at which application profile changes were pushed to the device(s) 104, e.g., as software updates or repairs, by the server device 102 or by another computing device. Similarly, in some examples, the performance degradation diagnostic application 112 may determine the instances of application profile changes associated with the device(s) 104 experiencing instances of performance degradation by receiving, or otherwise obtaining or accessing, a log indicating dates and times at which application profile changes were requested, initiated, or performed by users of the device(s) 104, e.g., by installing, updating, or uninstalling various applications.

Executing the performance degradation diagnostic application 112 may further include determining the likelihood that the application profile changes associated with the device(s) 104 are related to the instances of performance degradation experienced by the device(s) 104. In some examples, determining a likelihood that the application profile changes associated with the device(s) 104 are related to the instances of performance degradation experienced by the device(s) 104 may include applying a model, such as a statistical model or a Monte Carlo model, or, in some cases, a trained machine learning model, such as the performance degradation diagnostic machine learning model 116, to data associated with the instances of performance degradation experienced by the device(s) 104, data associated with the application profile changes associated with the device(s) 104, as well as other data such as data associated with characteristics of the device(s) 104, characteristics of the user(s) of the device(s) 104, logical groups of which the device(s) 104 are a part, etc., to identify or predict the likelihood that the application profile changes associated with the device(s) 104 are related to the instances of performance degradation experienced by the device(s) 104, e.g., as discussed in greater detail below with respect to the performance degradation diagnostic machine learning model 116.

Additionally, executing the performance degradation diagnostic application 112 may include identifying one or more fixes or mitigation techniques to mitigate the instances of performance degradation experienced by the device(s) 104. For instance, the fixes or mitigation techniques may include, but are not limited to: uninstalling an application that was installed on the device(s) 104 during the one or more application profile changes; installing an application that was uninstalled from the device(s) 104 during the one or more application profile changes; disabling an application that was installed on the device(s) 104 during the one or more application profile changes; installing a particular update of an application installed on the device(s) 104 during the one or more application profile changes; reverting an application installed on the device(s) 104 during the one or more application profile changes to a previous version, or any combination of any of the above.

In some examples, the performance degradation diagnostic application 112 may determine which fix or mitigation technique to identify based at least in part on whether an application installed on the device(s) 104 related to the performance degradation issue is an essential or a non-essential application. In particular, the performance degradation diagnostic application 112 may uninstall a non-essential application related to a performance degradation issue, but may revert an essential application related to a performance degradation issue to a previous version.

For instance, an "essential" application may be an application that is related to the type of work that the user of the device(s) 104 performs using the device(s) 104, or an application that is related to the functioning of the device(s) 104, while a "non-essential" application may be an application that is related to, for instance, social media, music, etc., and not related to the type of work the user of the device(s) 104 performs using the device(s) 104. In some examples, the applications may be grouped more broadly, into "business," "non-business," "utility," and "unassigned." Generally speaking, "business" and "utility" applications may be considered "essential," while "non-business" and other "unassigned" applications may be considered "non-essential."

Table 2 illustrates example types of applications that may be sorted into each of these groups:

TABLE 2

| Group | Sub-Groups |
|---|---|
| Business | Business, Productivity |
| Non-Business | Video Players, Travel and Local, Music, Entertainment, Social, News, Sports, Health, Games, Books, Shopping, Photography, Medical, Lifestyle, Food, Events, Beauty, etc. |
| Utility | Tools, Communication, Education |
| Unassigned | Others |

In some examples, the performance degradation diagnostic application 112 may determine whether a given application is essential or non-essential, using techniques as shown, for example, at FIG. 2, discussed in greater detail below.

That is, in some examples, the performance degradation diagnostic application 112 may determine whether a given application is essential or non-essential based on a database or lookup table listing various applications as either "essential" or "non-essential." As another example, the performance degradation diagnostic application 112 may determine whether a given application is essential or non-essential based on analyzing descriptions of the application from an application store using one or more semantic rules or keyword searches. For instance, the performance degradation diagnostic application 112 may use a python-based web scraper that collects application information from various application stores and popular application websites, and may analyze descriptions of each application from the collected information. Additionally, in some examples, the performance degradation diagnostic application 112 may apply specific semantic rules to identify web applications, and/or keyword specific rules to identify company applications for a particular company.

Table 3 illustrates example application names, and package names, for specific applications and their respective sub-groups.

TABLE 3

| Application Name | Package Name | Type | Classification | Sub-Category | Source |
|---|---|---|---|---|---|
| Calendar | com.google.android.calendar | Both | Non-Business | Productivity | Google Play Store |
| Maps | com.google.android.apps.maps | Both | Non-Business | Travel and Local | Google Play Store |
| Intune | com.microsoft.intune | Both | Business | Business | Google Play Store |
| MyDelivery | je.mydelivery.addressfinder | Foreground | Non-Business | Maps and Navigation | APK Scraper |
| YouTube | com.google.android.youtube | Foreground | Non-Business | Video Player | Google Play Store |

Figure 2:
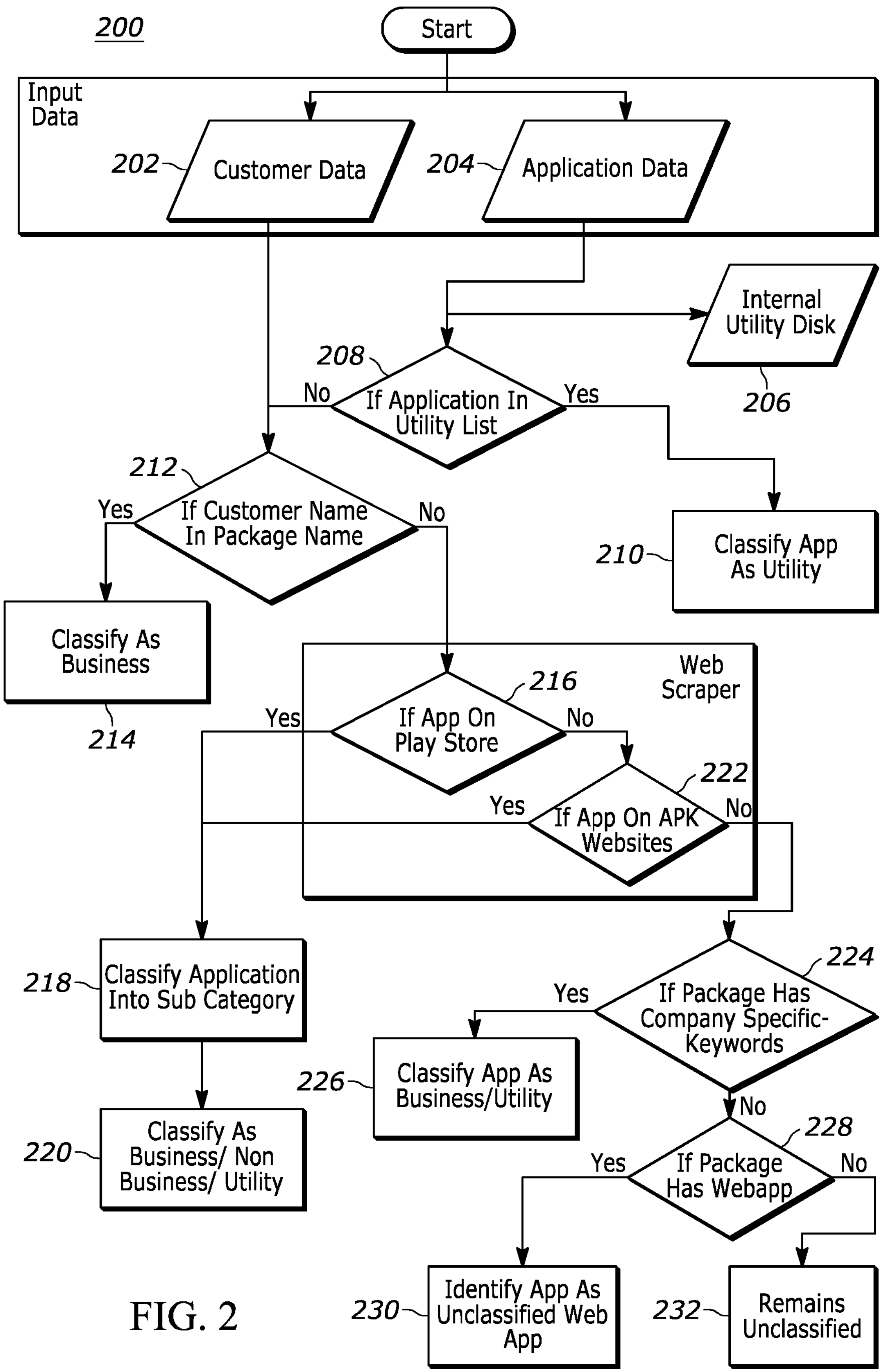
FIG. 2 is a flow diagram of an example process for implementing example methods and/or operations described herein including techniques for determining whether an application is essential or non-essential, as may be performed by the system of FIG. 1.

In particular, FIG. 2 illustrates a flow diagram of an example process 200 for implementing example methods and/or operations described herein including techniques for determining whether an application is essential or non-essential, as may be performed by the system of FIG. 1.

As shown at FIG. 2, the process 200 may include analyzing customer data 202 and application data 204 as input data. The process 200 may include comparing the application data 204 to an internal utility list 206. If the application is in the utility list (208, YES), the process 200 may classify (210) the application as a utility. If the application is not in the utility list (208, NO), the process 200 may compare (212) the customer name (i.e., from the customer data 202) to a package name for the application. If the customer name is in the package name (212, YES), the process 200 may classify (214) the application as a business application. If the customer name is not in the package name (212, NO), the process 200 may determine whether the application is present in an application store (216). If the application is present in the application store (216, YES), the process 200 may classify (218) the application into a sub category. In particular, the process 200 may use a python-based web scraper to classify (220) the application as business, non-business, or utility. If the application is not present in the application store (216, NO), the process 200 may determine (222) whether the application is present on APK websites. If so (222, YES), the method 200 may proceed to steps 218 and 220, as discussed above. If not (222, NO), the method 200 may include determining (224) whether the application package includes company-specific keywords. If so (224, YES), the method 200 may include classifying (226) the application as business/utility. If not (224, NO), the method 200 may include determining (228) whether the application package has a web application. If so (228, YES), the method 200 may include identifying (230) the application as an unclassified web application. If not (228, NO), the method 200 may include the application remaining (232) unclassified.

Moreover, in some examples, identifying the fixes or mitigation techniques may include applying a model, such as a statistical model or a Monte Carlo model, or, in some cases, a trained machine learning model, such as the performance degradation diagnostic machine learning model 116 or another machine learning model, to data associated with the instances of performance degradation experienced by the device(s) 104, data associated with the application profile changes associated with the device(s) 104, as well as other data such as data associated with characteristics of the device(s) 104, characteristics of the user(s) of the device(s) 104, logical groups of which the device(s) 104 are a part, etc., to identify or predict one or more fixes or mitigation techniques to mitigate the instances of performance degradation experienced by the device(s) 104, e.g., as discussed in greater detail below.

Furthermore, executing the performance degradation diagnostic application 112 may include applying the identified fixes or mitigation techniques to the device(s) 104 affected by the instances of performance degradation. For instance, applying the identified fixes or mitigation techniques to the device(s) 104 affected by the instances of performance degradation may include causing the server device 102 or another computing device to push a software update to the device(s) 104. Furthermore, in some examples, applying the identified fixes or mitigation techniques to the device(s) 104 affected by the instances of performance degradation may include the performance degradation diagnostic application 112 sending instructions to the device(s) 104 for performing the identified fixes or mitigation techniques. For instance, the instructions may be computer-readable instructions executed by the processors of the device(s) 104, or the instructions may be human-readable instructions which the device(s) 104 can display (e.g., via a user interface) in the form of a notification or alert to the user(s) of the device(s) 104, who can in turn follow the instructions to perform the fixes or mitigation techniques to the device(s) 104. Additionally, in some examples, applying the identified fixes or mitigation techniques to the device(s) 104 may include generating an IT ticket and sending it to a device associated with an IT worker, or otherwise sending an indication to another device besides the device(s) 104 with which the instances of performance degradation are associated, including indications of the identified fixes or mitigation techniques.

Turning now to the trained performance degradation diagnostic machine learning mode 116, in some examples, the trained performance degradation diagnostic machine learning model 116 may be executed on the server device 102, while in other examples the performance degradation diagnostic machine learning model 116 may be executed on another computing system, separate from the server device 102. For instance, the server device 102 may send the data corresponding to instances of performance degradation associated with the device(s) 104, application profile changes applied to the device(s) 104, logical groups and/or other characteristics associated with the device(s) 104 or users thereof, etc., from the devices 104 to another computing system, where the trained performance degradation diagnostic machine learning model 116 is applied to the data corresponding to instances of performance degradation associated with the device(s) 104, application profile changes applied to the device(s) 104, logical groups and/or other characteristics associated with the device(s) 104 or users thereof, etc. to the other computing system. The other computing system may send a prediction or identification of the likelihood that one of the application profile changes applied to one or more of the device(s) 104 is related to the instances of performance degradation associated with one or more of the new devices, one or more fixes or mitigation techniques for fixing or mitigating the instances of performance degradation associated with the device(s) 104, and/or the likelihood of success for the one or more fixes or mitigation techniques for fixing or mitigating the instances of performance degradation associated with the device(s) 104, based upon applying the trained performance degradation diagnostic machine learning model 116 to the data corresponding to instances of performance degradation associated with the device(s) 104, application profile changes applied to the device(s) 104, logical groups and/or other characteristics associated with the device(s) 104 or users thereof, etc., to the server device 102. Moreover, in some examples, the performance degradation diagnostic machine learning model 116 may be trained by performance degradation diagnostic machine learning model training application 114 executing on the server device 102, while in other examples, the performance degradation diagnostic machine learning model 116 may be trained by a machine learning model training application executing on another computing system, separate from the server device 102.

Whether the performance degradation diagnostic machine learning model 116 is trained on the server device 102 or elsewhere, the performance degradation diagnostic machine learning model 116 may be trained (e.g., by the performance degradation diagnostic machine learning model training application 114) using training data from the server device 102, devices 104, and/or databases 118 or 120 corresponding to, for instance, historical instances of performance degradation associated with historical devices, historical application profile changes applied to the historical devices, historical logical groups and/or other characteristics associated with the historical devices, historical fixes or mitigation techniques applied to the devices to fix or mitigate the historical instances of performance degradation and associated success rates, etc. The trained machine learning model may then be applied to new data corresponding to instances of performance degradation associated with new devices, new application profile changes applied to the new devices, new logical groups and/or other characteristics associated with the new devices to identify or predict, e.g., the likelihood that one of the new application profile changes applied to one or more of the new devices is related to the instances of performance degradation associated with one or more of the new devices, one or more fixes or mitigation techniques for fixing or mitigating the new instances of performance degradation associated with one or more of the new devices, and/or the likelihood of success for the one or more fixes or mitigation techniques for fixing or mitigating the new instances of performance degradation associated with one or more of the new devices.

In various aspects, the performance degradation diagnostic machine learning model 116 may comprise a machine learning program or algorithm that may be trained by and/or employ a neural network, which may be a deep learning neural network, or a combined learning module or program that learns in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the performance degradation diagnostic machine learning model 116 may comprise a library or package executed on the server device 102 (or other computing devices not shown in FIG. 1). For example, such libraries may include, but are not limited to, the TENSORFLOW based library, the PYTORCH library, and/or the SCIKIT-LEARN Python library.

Machine learning, as referenced herein, may involve identifying and recognizing patterns in existing data (such as training a model based upon historical instances of performance degradation associated with historical devices, historical application profile changes applied to the historical devices, historical logical groups and/or other characteristics associated with the historical devices, historical fixes or mitigation techniques applied to the devices to fix or mitigate the historical instances of performance degradation and associated success rates, etc.) in order to facilitate making predictions or identification for subsequent data (such as using the machine learning model on new data corresponding to instances of performance degradation associated with new devices, new application profile changes applied to the new devices, new logical groups and/or other characteristics associated with the new devices to determine a prediction or identification of the likelihood that one of the new application profile changes applied to one or more of the new devices is related to the instances of performance degradation associated with one or more of the new devices, one or more fixes or mitigation techniques for fixing or mitigating the new instances of performance degradation associated with one or more of the new devices, and/or the likelihood of success for the one or more fixes or mitigation techniques for fixing or mitigating the new instances of performance degradation associated with one or more of the new devices based on the new data corresponding to instances of performance degradation associated with new devices, new application profile changes applied to the new devices, new logical groups and/or other characteristics associated with the new devices).

Machine learning model(s) may be created and trained based upon example data (e.g., "training data") inputs or data (which may be termed "features" and "labels") to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided to subsequent inputs for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In addition, memories 110 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memory 110 may include instructions for carrying out any of the steps of the method 1100 via an algorithm executing on the processors 108, which are described in greater detail below with respect to FIG. 11. It should be appreciated that one or more other applications may be envisioned and that are executed by the processor(s) 108. It should be appreciated that given the state of advancements of mobile computing devices, the processes, functions, and steps described herein as being performed by the server device 102 may be present together on a mobile computing device.

Battery Discharge and/or Battery Swap Use Case

In an example, a device may report a high number of swaps (e.g., higher than a swap threshold) due to a high battery discharge rate (e.g., higher than a battery discharge threshold) of the batteries in a particular day. This behavior may be correlated to any applications that might have been installed/upgraded in the last 7 days to suggest the possible root causes. In particular, a determination may be made as to whether the higher number of swaps and/or higher battery discharge rate is related to an application rollout or version upgrade.

Figure 3:
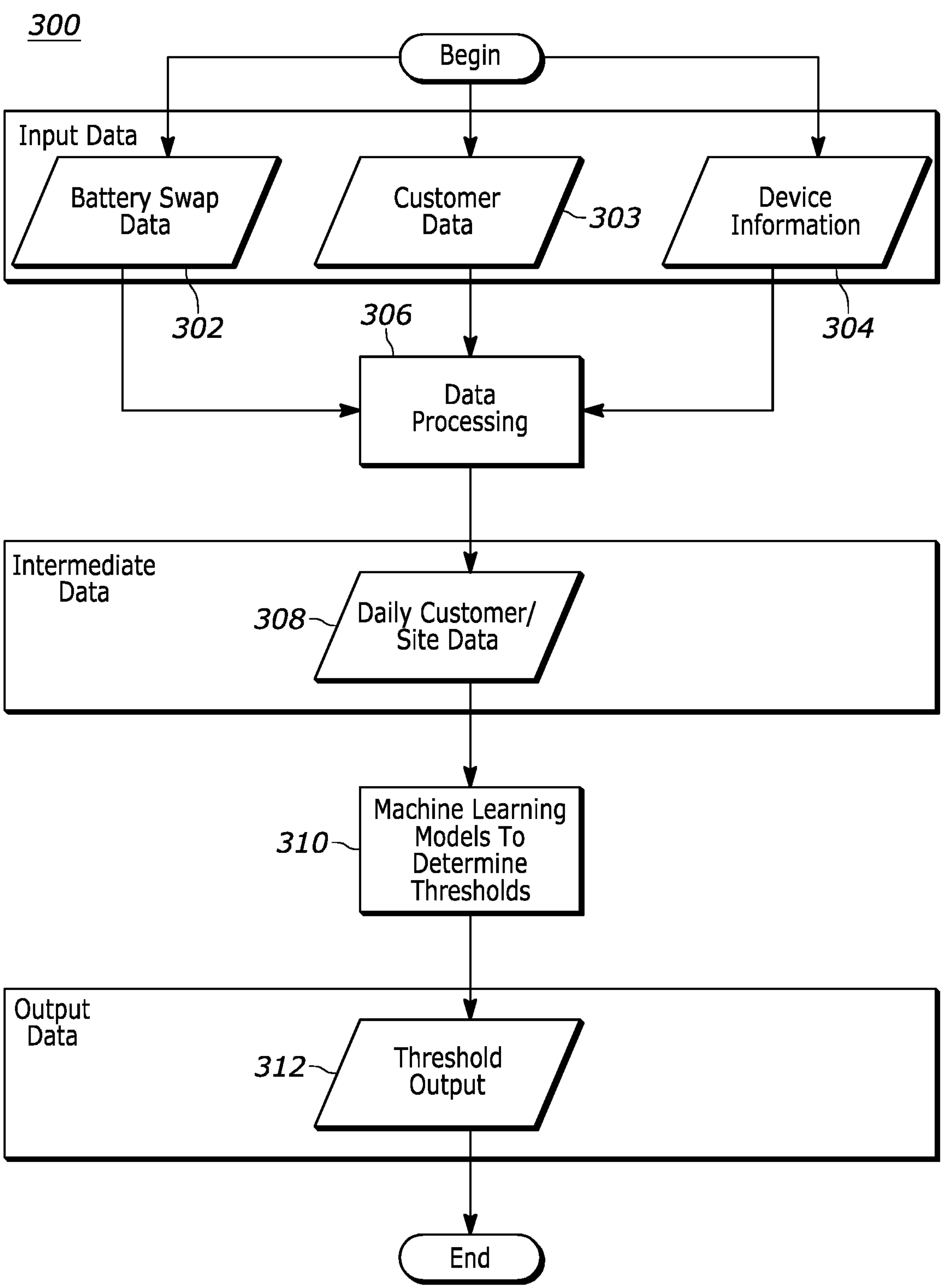
FIG. 3 is a flow diagram of an example process for implementing example methods and/or operations described herein including techniques for determining a battery swap threshold, as may be performed by the system of FIG. 1.

FIG. 3 illustrates a flow diagram of an example process 300 for implementing example methods and/or operations described herein including techniques for determining a battery swap threshold, as may be performed by the system of FIG. 1, as discussed with respect to Tables 4, 5, and 6 below.

The input data for battery swaps, as may be provided to a statistical model, may include raw data combining information related to the device 304, customer data 303, and the battery swap data 302 collected for multiple devices to give a holistic view. The customer data may be used to sort devices logically into groups to account for customer-specific behaviors. This is also done on a device model level to account for patterns among similar models since different models may have a different type of behavior. For training purposes, data from the last 180 days may be collected, and aggregated to a day-to-day level. Additionally, a daily battery swap count is calculated. On the days when no battery swap has occurred, this count for a device would be zero. The days that a device was active are considered while calculating the battery swap threshold. For a device to be termed active on a given day the device must have performed some activity, for example—a scan, using an application, putting the device on charge or a battery swap. The average is then calculated across all active days versus days on which there were swaps. Table 4 illustrates an example of the type of data that is collected, and the data type and format. The data formats shown below illustrate one example of possible data formats, however, other data formats may be used in various embodiments.

TABLE 4

| Field | Description | Data Type | Format |
|---|---|---|---|
| Serial Number | Unique set of characters to identify a device | String | Alpha-numeric |
| Master ID | Unique number used to identify a customer | Integer | 0-∞ |
| Company Name | Name of the company that uses the device | String | Alpha-numeric |
| Site Name | The site at which the device is being used on that day | String | Alpha-numeric |
| Model Number | Device model | String | Alpha-numeric |
| Slot Date | The date corresponding to the site the device is being used on | Date | yyyy-mm-dd |
| Raised Timestamp | The timestamp of the battery swap event. The distinct count of this per serial number will give number of swaps | Timestamp | yyyy-mm-dd hh:mm:ss |

The method 300 may include data preprocessing 306, which may involve sorting each device into a logical group. A logical group sorts the devices to their respective customers/sites and groups devices of the same model together. This is done to account for the similarities in device usage across the devices belonging to the same customer and site and to incorporate patterns only among the same kind of device models. The logical groups can include the customer level and the site level. The customer level logical group is a combination of the Master ID and the device model, while the site level logical group is a combination of the Master ID, Site Name, and the Device Model.

Table 5 illustrates daily customer/site battery swap data 308 at the serial number level, including the number of swaps performed on days that a device was active, with activity including scans, application usage, battery swaps, and/or charging.

TABLE 5

| Serial Number | Logical Grouping | Date | Number of Swaps |
|---|---|---|---|
| XXXXXXX096 | xxx_XX51 | 2021 Jun. 1 | 0 |
| XXXXXXX512 | xxx_XX51 | 2021 Jun. 2 | 1 |
| XXXXXXX374 | xxx_XX51 | 2021 Jun. 3 | 0 |
| XXXXXXX357 | xxx_XX51 | 2021 Jun. 4 | 0 |
| XXXXXXX894 | xxx_XX51 | 2021 Jun. 5 | 0 |

A battery swap threshold may be calculated using machine learning methods 310, which may include applying the model 116, and/or applying a statistical formula: $\mu(x)+\sigma(x)*1.5$, with $\mu(x)$ being the average number of swaps, and $\sigma(x)$ being the standard deviation for a number of swaps. For instance, Table 6 illustrates example battery swap threshold outputs 312 for each of several logical groups.

TABLE 6

| Logical Grouping | Battery Swap Threshold | Reason Code* |
|---|---|---|
| xxx_XX51 | 1.17 | 1000 |
| xxx_XX51 | 0.74 | 1000 |
| xxx_XX51 | 1.52 | 1000 |
| xxx_XX51 | 0.25 | 1001 |
| xxx_XX51 | 0.0 | 1000 |

As shown at Table 6, a reason code is assigned to each threshold based on whether it has been prepared from sufficient data. The threshold for sufficient data is configurable and as an example could be 60 calendar days of data. 1000 indicates sufficient data and 1001 indicates insufficient data. The reason codes can also be configured and extended to other scenarios.

Figure 4:
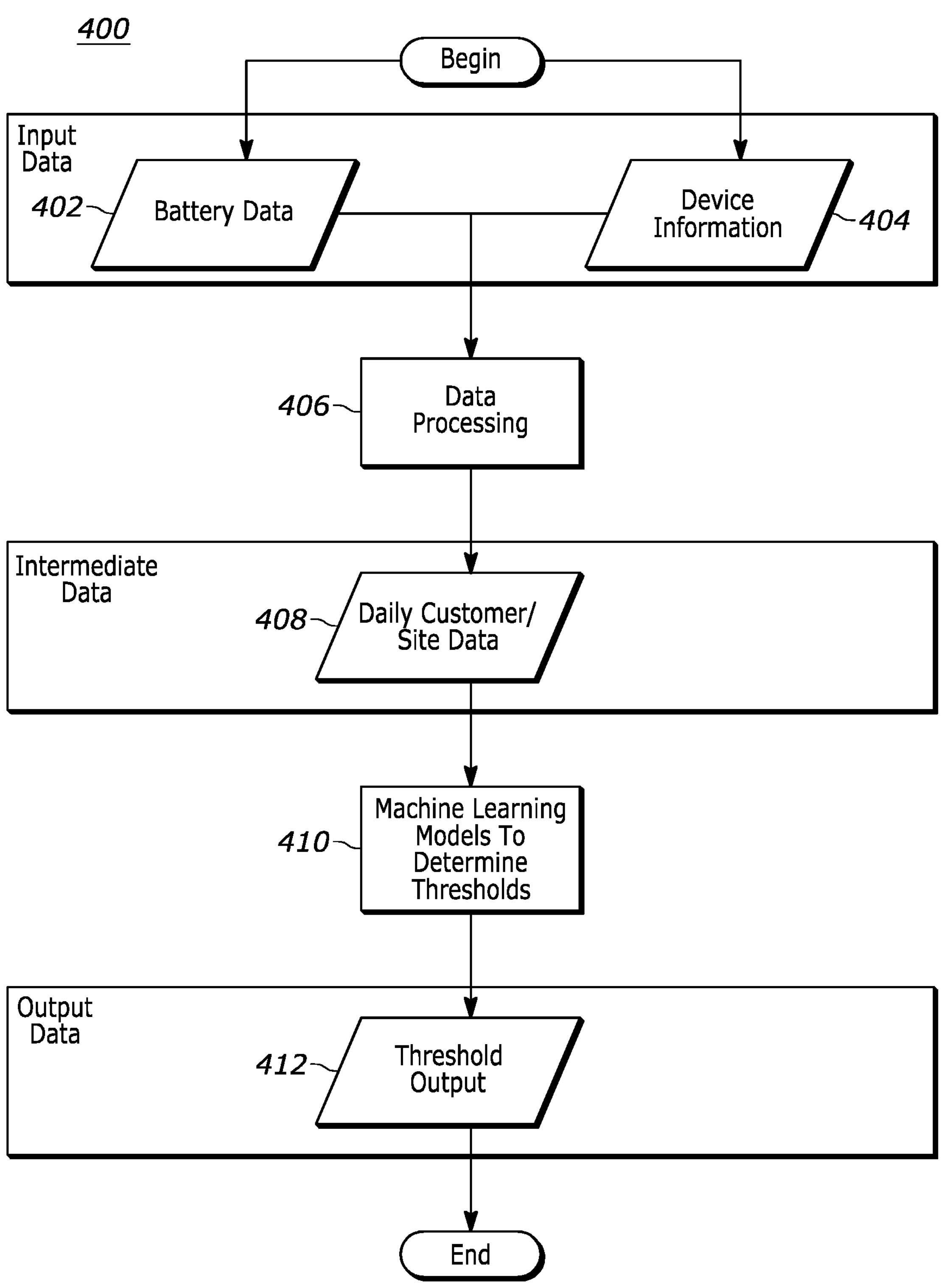
FIG. 4 is a flow diagram of an example process for implementing example methods and/or operations described herein including techniques for determining a battery discharge threshold, as may be performed by the system of FIG. 1.

FIG. 4 is a flow diagram of an example process 400 for implementing example methods and/or operations described herein including techniques for determining a battery discharge threshold, as may be performed by the system of FIG. 1, as discussed with respect to Tables 7, 8, and 9 below.

As with the battery swaps, the input data for battery discharges, as may be provided to a statistical model, may include raw data combining information related to the device 404, customer data, and the battery discharge data 402 collected for multiple devices to yield a holistic view. The customer data may be used to sort devices logically into groups to account for customer-specific behaviors. This is also done on a device model level to account for patterns among similar models since different models may have a different type of behavior. For training purposes, data from the last 180 days may be collected, and the battery discharge rate may be aggregated at an hourly level. The device's battery level along with the previous known battery level is taken to calculate the battery discharge by taking the ratio of the 2 over the hour to calculate the hourly discharge rate. The days that a device was active are considered while calculating the battery discharge threshold. For a device to be termed active on a given day the device must have performed some activity, for example—a scan, using an application, putting the device on charge or a battery swap. The average is then calculated across all active days. Table 7 illustrates an example of the type of data that is collected, and the data type and format. The data formats shown below illustrate one example of possible data formats, however, other data formats may be used in various embodiments.

TABLE 7

| Field | Description | Data Type | Format |
|---|---|---|---|
| Serial Number | Unique set of characters to identify a device | String | Alpha-numeric |
| Master ID | Unique number used to identify a customer | Integer | 0-∞ |
| Company Name | Name of the company that uses the device | String | Alpha-numeric |

TABLE 7-continued

| Field | Description | Data Type | Format |
| --- | --- | --- | --- |
| Site Name | The site at which the device is being used on that day | String | Alpha-numeric |
| Model Number | Device model | String | Alpha-numeric |
| Slot Date | The date corresponding to the site the device is being used on | Date | yyyy-mm-dd |
| Raised Timestamp | The timestamp of the battery data being recorded. | Timestamp | yyyy-mm-dd hh:mm:ss |
| Battery Level | The battery level of the device at the recorded timestamp | Integer | 0-100 |
| Battery ID | Unique Identification of the battery | String | Alpha - numeric |
| AC Line Status | This indicates whether a device is currently on charge. If the device is on charge, it indicates what type of charge input it is getting as well | Integer | 0-2 |

As discussed above with respect to battery swaps and the method 300, the method 400 may include data preprocessing 406, which may involve sorting each device into a logical group for the purposes of calculating the battery discharge threshold. Table 7 illustrates daily customer/site battery discharge data 408 at the serial number level, including the battery levels of the device as recorded at intervals to calculate the battery discharge rate.

TABLE 8

| Logical Grouping | Raised Time and Date | Previous Raised Time and Date | Time Difference | Serial Number | Current Battery Level | Previous Battery Level | Battery Level Difference |
| --- | --- | --- | --- | --- | --- | --- | --- |
| xxx_XX51 | 2022 Jan. 24 19:19 UTC | 2022 Jan. 24 19:14 UTC | 5 | xxxx | 53 | 53 | 0 |
| xxx_XX51 | 2022 Jan. 24 19:24 UTC | 2022 Jan. 24 19:19 UTC | 5 | xxxx | 53 | 53 | 0 |
| xxx_XX51 | 2022 Jan. 24 19:29 UTC | 2022 Jan. 24 19:24 UTC | 5 | xxxx | 52 | 53 | 1 |

In the example shown at Table 8, the sum of battery level differences is 1 and the sum of time differences is 15, so the hourly battery discharge rate is $(1/15)*60=4\%$ discharge per hour. This hourly battery discharge rate may be fed into a statistical formula at the logical grouping level and then the threshold is calculated using machine learning methods 410, which may include applying the model 116, and/or a statistical model, including the following formula: $\mu(x)+\sigma(x)*1.5$, with $\mu(x)$ being the average battery discharge rate, and $\sigma(x)$ being the standard deviation for the battery discharge rate.

For instance, Table 9 illustrates example battery discharge thresholds 410 for each of several logical groups.

TABLE 9

| Logical Grouping | Battery Discharge Threshold | Reason Code* |
| --- | --- | --- |
| xxx_XX51 | 1.36 | 1000 |
| xxx_XX51 | 3.46 | 1000 |
| xxx_XX51 | 6.52 | 1001 |
| xxx_XX51 | 0.77 | 1000 |
| xxx_XX51 | 1.82 | 1001 |

As shown at Table 9 (as in Table 6), a reason code is assigned to each threshold based on whether it has been prepared from sufficient data. The threshold for sufficient data is configurable and as an example could be 60 calendar days of data. 1000 indicates sufficient data and 1001 indicates insufficient data. The reason codes can also be configured and extended to other scenarios.

Figure 5:
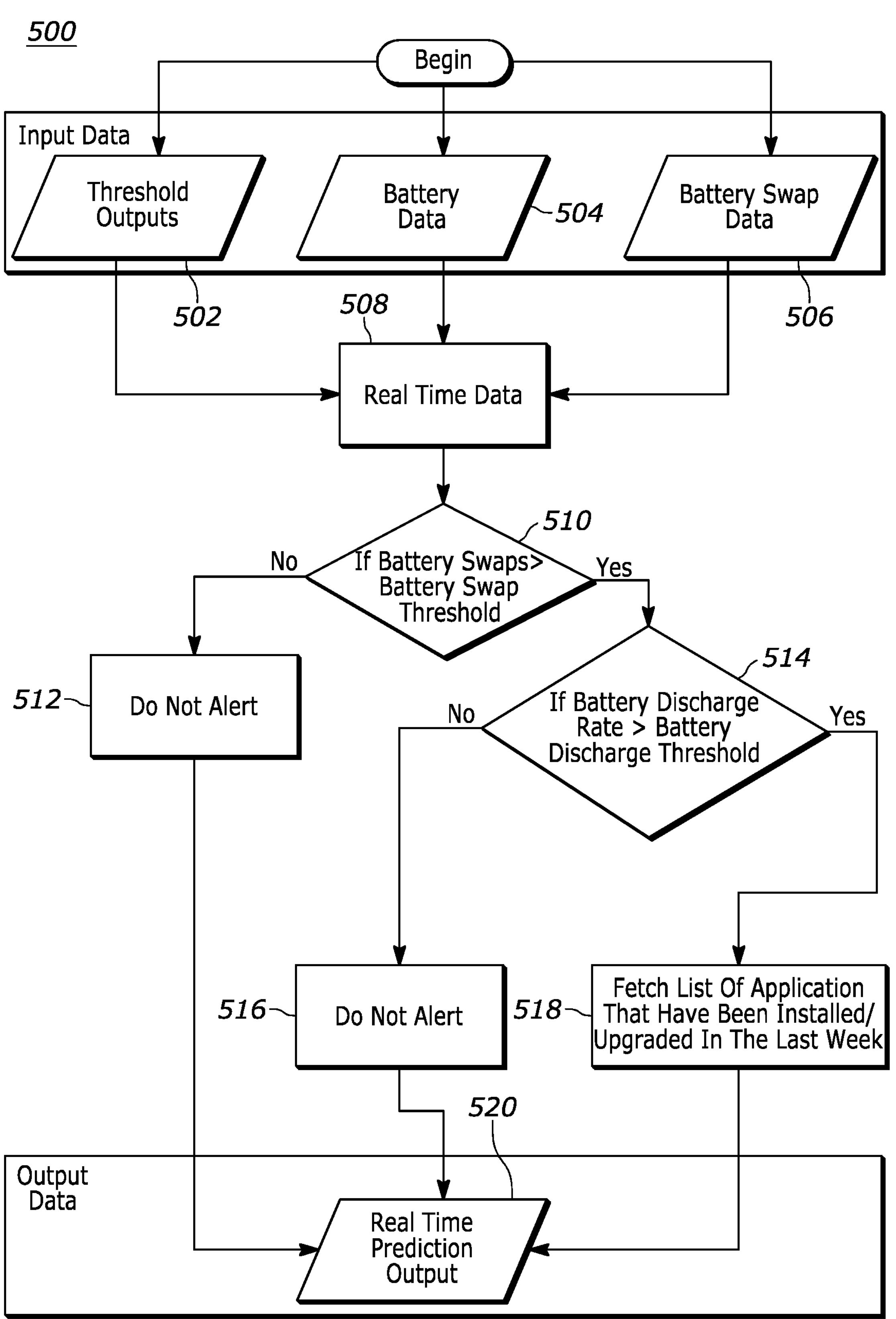
FIG. 5 is a flow diagram of an example process for implementing example methods and/or operations described herein including techniques for comparing battery swap and/or battery discharge data to their respective thresholds to determine whether to generate alerts and/or change application profiles based on the battery swap and/or battery discharge data, as may be performed by the system of FIG. 1.

FIG. 5 is a flow diagram of an example process 500 for implementing example methods and/or operations described herein including techniques for comparing battery swap and/or battery discharge data to their respective thresholds to determine whether to generate alerts and/or change application profiles based on the battery swap and/or battery discharge data, as may be performed by the system of FIG. 1, as discussed with respect to Table 10 below.

Table 10 illustrates the data from Tables 5 and 8 (e.g., the battery data 504, which may correspond to the battery data 402 from FIG. 4, and the battery swap data 506, which may correspond to the battery swap data 302 from FIG. 3) as compared against the thresholds (e.g., thresholds 502, which may correspond to the thresholds 312 from FIG. 3 and the thresholds 412 from FIG. 4) shown at Tables 6 and 9, resulting in real-time data 508.

TABLE 10

| Logical Grouping | Device Serial Number | Prediction Date | Number of Swaps | Battery Swap Threshold (Ceiling) | Battery Discharge Rate | Battery Discharge Threshold | Application Name |
|---|---|---|---|---|---|---|---|
| xxxx_XX51 | XXXXXXX112 | Dec. 20, 2021 | 1 | 1 | 3.67 | 5.13 | null |
| xxxx_XX51 | XXXXXXX171 | Dec. 20, 2021 | 2 | 1 | 8.08 | 6.94 | Google Chrome |
| xxxx_XX51 | XXXXXXX712 | Dec. 20, 2021 | 2 | 1 | 6.87 | 5.56 | Google Play services |
| xxxx_XX51 | XXXXXXX125 | Dec. 20, 2021 | 3 | 2 | 2.93 | 3.43 | null |

The method 500 may include determining (510) if the number of battery swaps is greater than the battery swap threshold. If the battery swaps are not greater than the battery swap threshold (510, NO), as shown in row 1 of Table 10, the battery swap threshold has not been breached and an alarm (512) will not be raised on that device. If the battery swaps are greater than the battery swap threshold (510, YES), a determination (514) may be made as to whether the battery discharge rate is greater than the battery discharge threshold. If the battery discharge rate is not greater than the battery discharge threshold (block 514, NO), as shown in n row 4 of Table 10, the battery swap threshold has been breached but the battery discharge threshold has not been breached, so an alarm (516) will not be generated. If the battery discharge rate is greater than the battery discharge threshold (block 514, YES), as shown in rows 2 and 3 of Table 10, both the battery swap and discharge thresholds have been breached. Alarms will be raised on these two devices and applications that have been installed/upgraded in the last 7 days will be fetched (518) and reported. In some examples, next steps (520) may include, but are not limited to, rolling back a new application version, or a battery replacement.

Application not Responding (ANR) Event Use Case

The Application Not Responding (ANR) event is used as an indicator in application health and improves application performance by alerting the user when an application has an excessive or an abnormal number of ANR events. Thresholds are calculated at a Customer/Site level over a period of 6 months to identify scenarios where the daily ANR event count for an application on a device is higher than normal. One of the reasons for a sudden increase in the number of ANR events could be a new application rollout or a site wide/company wide application version upgrade/downgrade.

Figure 6:
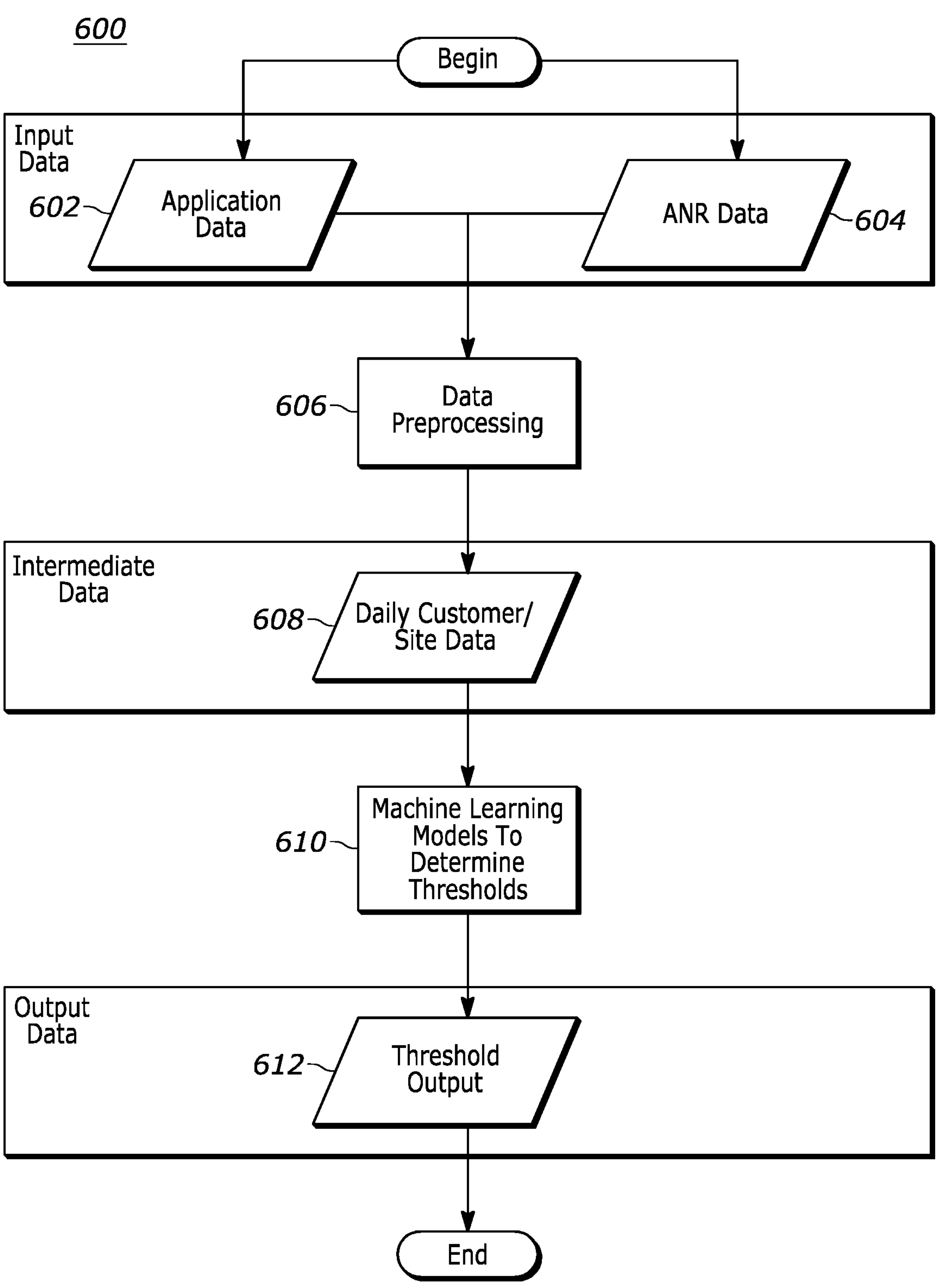
FIG. 6 is a flow diagram of an example process for implementing example methods and/or operations described herein including techniques for determining an Application Not Responding (ANR) event threshold, as may be performed by the system of FIG. 1.

FIG. 6 is a flow diagram of an example process 600 for implementing example methods and/or operations described herein including techniques for determining an ANR event threshold, as may be performed by the system of FIG. 1, as discussed with respect to Tables 11, 12, 13, and 14 below.

As with the battery swaps and battery discharges, the input data for ANR events, as may be provided to a statistical model, may include raw data combining information related to the device, customer data, application data 602, and the ANR event data 604 collected for multiple devices to yield a holistic view. The customer data may be used to sort devices logically into groups to account for customer-specific behaviors. This is also done on a device model level to account for patterns among similar models since different models may have a different set of applications or may be compatible with different versions of the same application. For training purposes, data from the last 180 days may be collected, and the ANR event data may be aggregated at a day-to-day level, at which daily ANR event counts for the device and application are calculated. On days when no ANR event occurred, this count would be zero. Out of the 180 days, a logic is applied to exclude the days where it is known that a specific application was not used on a device. It is assumed that only the days within the 180-day period that have recorded usage of the application will be considered when calculating the thresholds. Table 11 illustrates an example of the type of data that is collected, and the data type and format. The data formats shown below illustrate one example of possible data formats, however, other data formats may be used in various embodiments.

TABLE 11

| Field | Description | Data Type | Format |
|---|---|---|---|
| Serial Number | Unique set of characters to identify a device | String | Alpha-numeric |
| Master ID | Unique number used to identify a customer | Integer | 0-∞ |
| Company Name | Name of the company that uses the device | String | Alpha-numeric |
| Site Name | The site at which the device is being used on that day | String | Alpha-numeric |

TABLE 11-continued

| Field | Description | Data Type | Format |
|---|---|---|---|
| Model Number | Device model | String | Alpha-numeric |
| Slot Date | The date corresponding to the site the device is being used on | Date | yyyy-mm-dd |
| Application | Name of the application | String | Alpha-numeric |
| Package | The package name of an application - used as a unique identifier for an app | String | Alpha-numeric |
| Raised Timestamp | The timestamp of an ANR event. The distinct count of the same can give the number of ANR counts | Timestamp | yyyy-mm-dd hh:mm:ss |
| Duration | The amount of time an application has been used for | Float | 0-∞ |

The method 600 may include data preprocessing 606, which may involve sorting each device into a logical group. A logical group sorts the devices to their respective customers/sites and groups devices of the same model together. This is done to account for the similarities in device usage across the devices belonging to the same customer and site and to incorporate patterns only among the same kind of device models. Logical groups can include, the customer level and the site level. The customer level logical group is a combination of the Master ID and the device model, while the site level logical group is a combination of the Master ID, Site Name, and the Device Model.

Table 12 illustrates daily customer/site ANR event data 608 at the serial number level, including the number of ANRs performed on days that an application was active.

The reason codes explain the following scenarios described at Table 14.

TABLE 14

| Reason Code | Reason |
|---|---|
| 1000 | Threshold available |
| 1001 | Missing company mapping |
| 1002 | Insufficient data |
| 1099 | Others |

In real time, these thresholds may be mapped back to the total count of ANR events generated by an application on a device belonging to a logical group (customer/site) daily.

TABLE 12

| Serial Number | Logical Grouping | Application Name | Application Package Name | Raised Date | Daily ANR Count |
|---|---|---|---|---|---|
| XXXXXXXXXXX678 | xxxx_XX21 | Maps | com.google.android.apps.maps | 2022 Feb. 3 | 2 |
| XXXXXXXXXXX654 | xxxx_XX72 | Email | com.android.email | 2021 Nov. 15 | 1 |
| XXXXXXXXXXX865 | xxxx_XX52 | Chrome | com.android.chrome | 2022 Feb. 26 | 1 |

Thresholds are calculated at a Customer/Site level over a period of 6 months to identify scenarios where the daily ANR event count for an application on a device is higher than normal.

One way to calculate the threshold involves using machine learning methods 610, which may include applying the model 116, and/or a statistical model, including using the following formula: $\mu(x)+\sigma(x)*1.5$, with $\mu(x)$ being the average number of daily ANR events, and $\sigma(x)$ being the standard deviation for the number of daily ANR events.

For instance, Table 13 illustrates example daily ANR event count thresholds 612 for each of several logical groups.

TABLE 13

| Logical Grouping | Package | Threshold | Reason Code |
|---|---|---|---|
| xxxx_XX21 | com.android.chrome | 2 | 1000 |
| xxxx_XX72 | com.andriod.phone | 2 | 1000 |
| xxxx_XX52 | system_server | 1.67 | 1000 |

Figure 7:
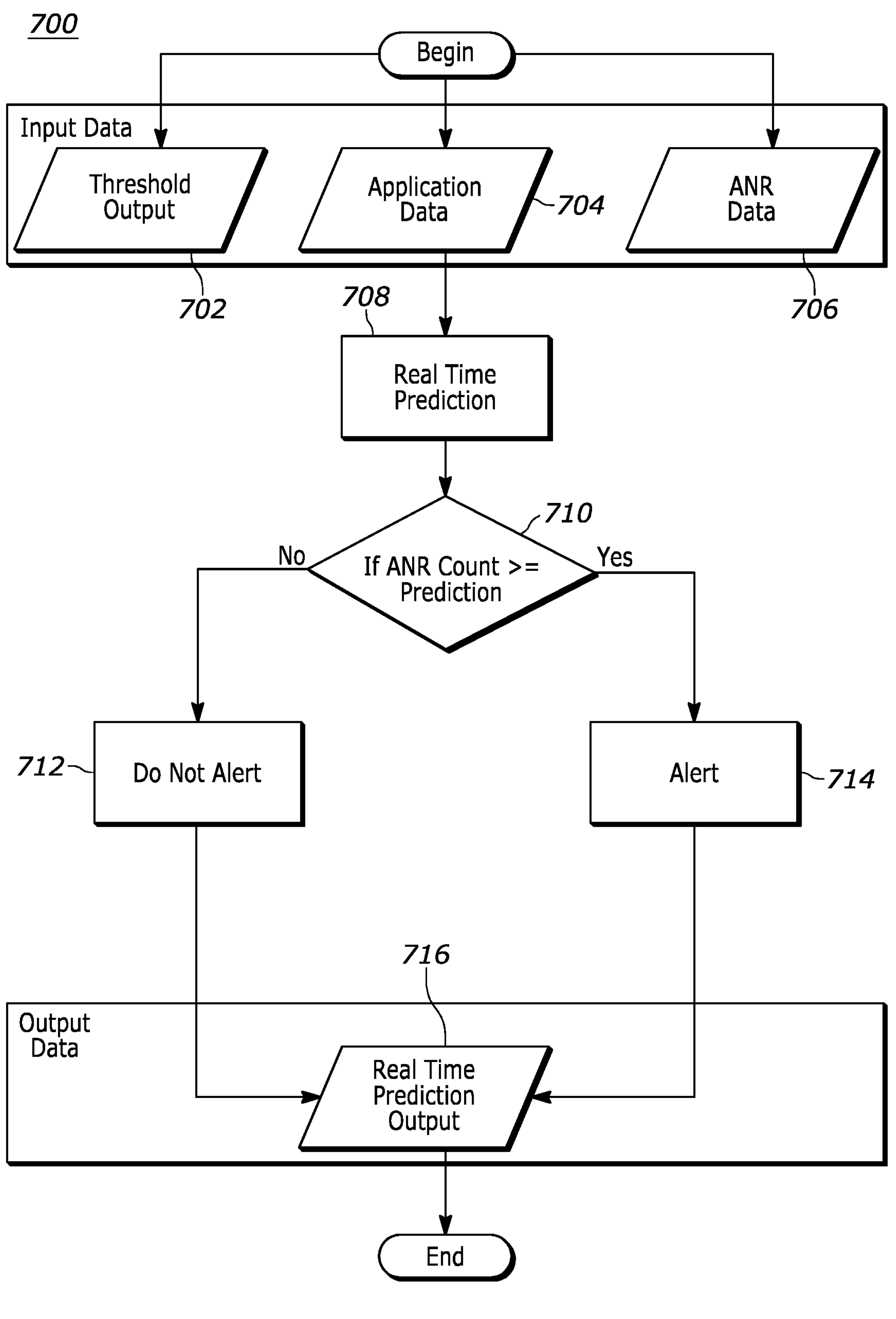
FIG. 7 is a flow diagram of an example process for implementing example methods and/or operations described herein including techniques for comparing ANR event data to an ANR threshold to determine whether to generate alerts and/or change application profiles based on the ANR data, as may be performed by the system of FIG. 1.

FIG. 7 is a flow diagram of an example process 700 for implementing example methods and/or operations described herein including techniques for comparing ANR event data to an ANR threshold to determine whether to generate alerts and/or change application profiles based on the ANR event data, as may be performed by the system of FIG. 1, as discussed with respect to Table 15 below.

Table 15 illustrates the data from Table 12 (e.g., the application data 704 and ANR event data 706, which may correspond to the application data 602 and ANR event data 604 of FIG. 6) compared against the data from Table 13 (e.g., the threshold output 702, which may correspond to the thresholds 612 of FIG. 6), resulting in real-time prediction data 708.

TABLE 15

| Serial Number | Logical Grouping | Application Name | Package Name | Application Version | Prediction Date | Daily ANR Count | Threshold | Reason Code |
|---|---|---|---|---|---|---|---|---|
| XXXXXXXXXXX123 | xxxx_XX21 | Spark 2.0 | com.ecolab.apps.spark | 1.25.3 | 2022 Mar. 24 | 3 | 2.24 | 1000 |
| XXXXXXXXXXX876 | xxxx_XX52 | Messenger | com.facebook.orca | 349.0.0.7.108 | 2022 Mar. 8 | 1 | 2.23 | 1000 |

As shown at Table 15, the thresholds represent the expected ANR events in a day for a device and an application. If the ANR count for a given day does not cross the threshold (710, NO), then no alert is generated (712). If the ANR count for a given day ever crosses the threshold (710, YES), then an alert for these specific incidents is generated (714). In some examples, next step 716 may include, but is not limited to, checking if the application having the ANR event issue has been rolled out in the recent past, and/or raising an IT ticket for the rollback of the application version associated with the ANR events.

Typical Installed Application Use Case

Figure 8:
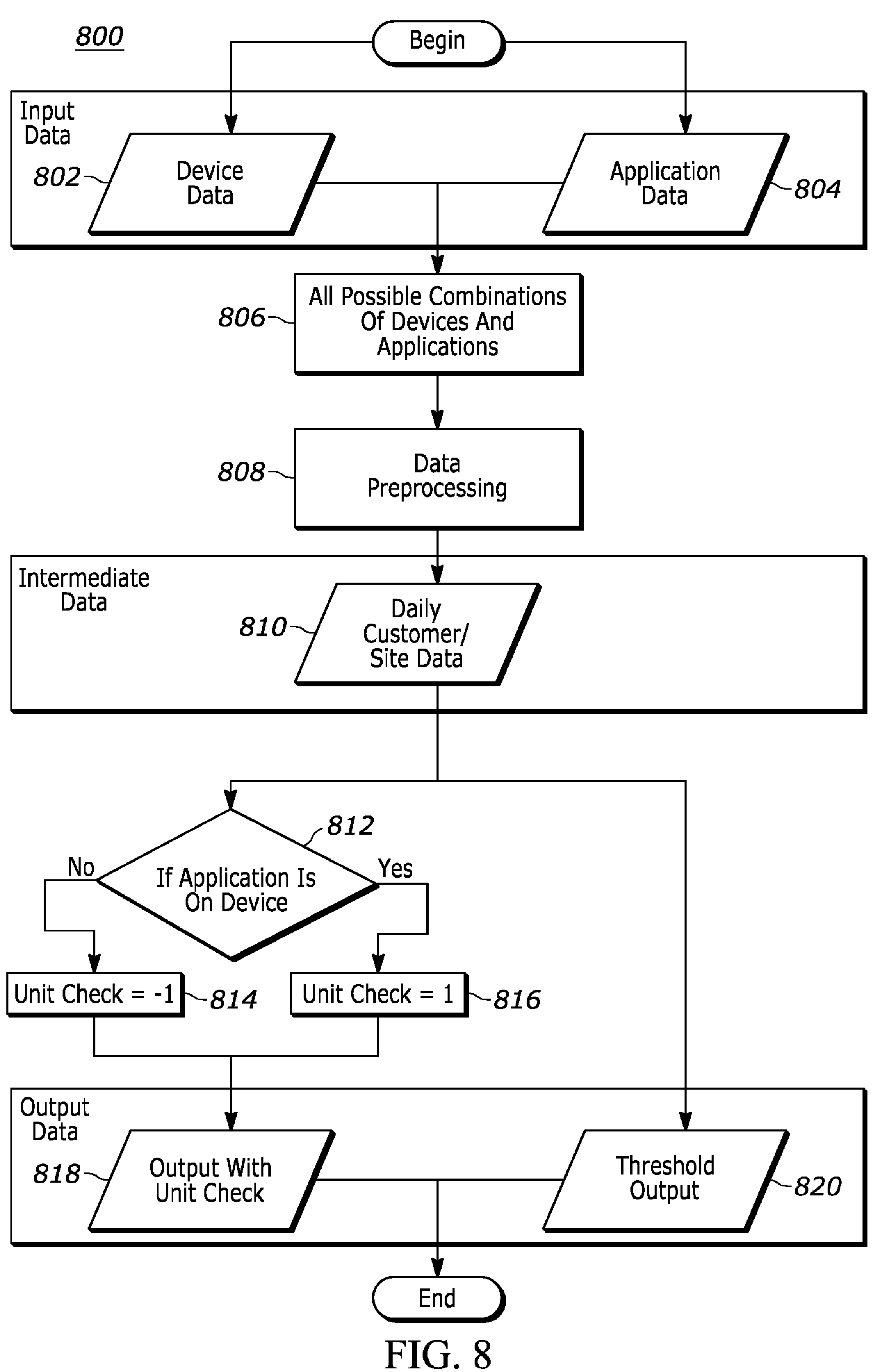
FIG. 8 is a flow diagram of an example process for implementing example methods and/or operations described herein including techniques for determining a threshold related to whether a given application is typically installed, as may be performed by the system of FIG. 1.

FIG. 8 is a flow diagram of an example process 800 for implementing example methods and/or operations described herein including techniques for determining a threshold related to whether a given application is typically installed, as may be performed by the system of FIG. 1, as discussed with respect to Tables 16-17 below.

Table 16 illustrates device data 802 and application data 804. The method 800 may include analyzing (806) all possible combinations of device and application data, and preprocessing (808) the data to generate the daily customer/site data 810 including the percentage of devices at a given store, having a given model number and given serial number, that have a variety of different applications installed (also shown at Table 16).

In particular, for each device, a "unit check" may be performed (812) to determine whether a given application is installed (812, YES), resulting in a unit check of "1" (816), or not installed (812, NO), resulting in a unit check of "−1" (814), resulting in a unit check output (818).

TABLE 16

| Master ID | Store | Model Number | Serial Number | Name | Devices Present | Total | Percentage |
|---|---|---|---|---|---|---|---|
| 6XXX | 6XXX_XX72 | TC72 | 23XXXXXXXX494 | com.symbol.mxmf.csp.certmgr | 91134 | 133850 | 68.1 |
| 4XXX | 4XXX_XX51 | TC51 | 23XXXXXXXX290 | PTT Express | 32134 | 32634 | 98.5 |
| 4XXX | 4XXX_XX51 | TC51 | 23XXXXXXXX371 | MyPharmacy | 31852 | 32634 | 97.6 |
| 6XXX | 6XXX_XX51 | ET51 | 23XXXXXXXX893 | Contacts | 5939 | 7877 | 75.4 |

Furthermore, using the customer/site data 810, a threshold (820) related to whether a given application is typically installed involves using machine learning methods, which may include applying the model 116, and/or a statistical model, including using the following formula: $\mu(x)+\sigma(x)*1.5$, with $\mu(x)$ being a percentage reflecting the average number of devices that have a particular application installed out of the total number of devices, and $\sigma(x)$ being the standard deviation for the percentage reflecting the average number of devices that have a particular application installed out of the total number of devices.

Moreover, Table 17 illustrates example threshold values 820 related to whether a given application is typically installed, associated with various applications for particular model numbers of the same Master ID.

TABLE 17

| Master ID | Model Number | Application Name | Threshold |
|---|---|---|---|
| 2048 | XX56 | SMS/MMS | 2.75 |
| 2048 | XX25 | com.symbol.mxmf.csp.lifeguardotamanager | 6.25 |
| 2048 | XX25 | Call Recorder | 6.25 |
| 2048 | XX25 | WorryFreeWiFiCSP | 6.25 |
| 2048 | XX25 | ScanningFrameworkAPK | 6.25 |

Figure 9:
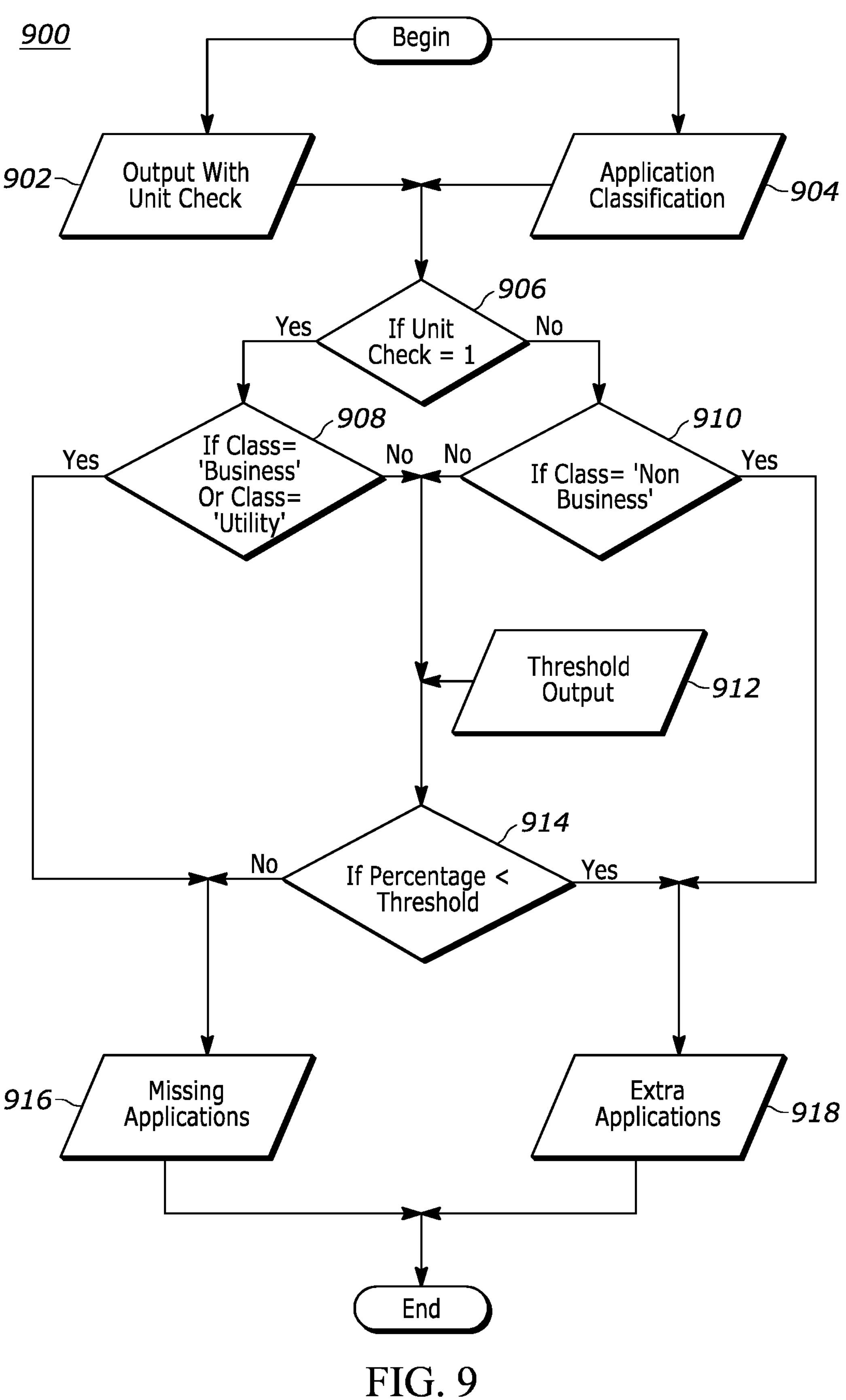
FIG. 9 is a flow diagram of an example process for implementing example methods and/or operations described herein including techniques for comparing application installation data to an application installation threshold to determine whether to install a new application or roll back an existing application, as may be performed by the system of FIG. 1.

FIG. 9 is a flow diagram of an example process 900 for implementing example methods and/or operations described herein including techniques for comparing application installation data to an application installation threshold to determine whether to install a new application or roll back an existing application, as may be performed by the system of FIG. 1, as discussed with respect to Tables 18 and 19 below.

As shown in FIG. 9, the output with unit check data (902, which may correspond to the output with unit check data 818 from FIG. 8), and the application classification data (904, which may correspond to the application classification discussed with respect to FIG. 2.) may be obtained, and a determination may be made as to whether a particular application is installed on a particular device (906). For instance, if the unit check=1 (906, YES), and the application is classified as a "business" or "utility" application (908, YES), the application may be determined to be missing (916). If the unit check=1, but the application is determined to not be a "business" or "utility" application (908, NO), a determination (914) may be made as to whether the percentage of devices at a given store, having a given model number and given serial number, that have the application installed, is greater than the threshold output (912, which may correspond to the threshold output 820 from FIG. 8). If the percentage is greater than the threshold (914, NO), then the application may be determined to be missing (916). If the percentage is less than the threshold (914, YES), then the application may be determined to be an extra application (918).

If the unit check does not equal 1 (e.g., unit check=−1 (906, NO)), and the application is not "non business" (910, NO), a determination (914) may be made as to whether the percentage of devices at a given store, having a given model number and given serial number, that have the application installed, is greater than the threshold output (912, which may correspond to the threshold output 820 from FIG. 8). If the percentage is greater than the threshold (914, NO), then the application may be determined to be missing (916). If the percentage is less than the threshold (914, YES), then the application may be determined to be an extra application (918). If the unit check=−1, and the application is "non business" (910, YES), the application may be determined to be an extra application (918).

Table 18 illustrates a comparison of the data from Table 16 and Table 17.

TABLE 18

| Master Id | Store | Model Number | Serial Number | Name | Devices Present | Total | Percentage | Threshold | App Type | Reason Code | Result |
|---|---|---|---|---|---|---|---|---|---|---|---|
| 6XXX | 6XXX_XX56 | XX56 | XXXXXXXXX281 | Clock | 70 | 8247 | 0.8 | 1.05 | Utility | 1012 | Missing |
| 2XXX | 2XXX_XX77 | XX77 | XXXXXXXXX537 | Google Location History | 7 | 3463 | 0.2 | 0.11 | Unassigned | 1020 | Missing |
| 4XXX | 4XXX_XX51 | XX51 | XXXXXXXXX836 | PTT Express | 12 | 8617 | 0.1 | 71.92 | Business | 1010 | Missing |
| 6XXX | 6XXX_XX56 | XX56 | XXXXXXXXX580 | Google Keyboard | 5 | 8247 | 0.1 | 0.06 | Unassigned | 1020 | Missing |
| 4XXX | 4XXX_XX51 | XX51 | XXXXXXXXX512 | OutletMobility | 834 | 2723 | 30.6 | 64.62 | Business | 1010 | Missing |

The reason codes explain the following scenarios described at Table 19.

TABLE 19

| Reason Codes | App Type | Conclusion |
|---|---|---|
| 1010 | Business | Missing |
| 1011 | Non-Business | Extra |
| 1012 | Utility | Missing |
| 1020 | Unassigned | Depends on Threshold |

As shown at FIG. 9, if a given device has a desired application missing, the missing application may be automatically installed. Similarly, if a given device has an application installed which should not be installed, the application may be rolled back automatically.

Application Version Use Case

A determination may be made as to whether an application version on a given device is the desired/optimized version, or otherwise the most common version, or whether the application version on the device has been changed. In particular, a difference between a particular device's application version and the most common version may be identified for a particular device, so that proactive action may be taken, leading to benefits including, but not limited to, a reduction in incident tickets, a reduction in device down time, an increase in productivity, and the ability to correlate device health issues to a change in version.

Figure 10:
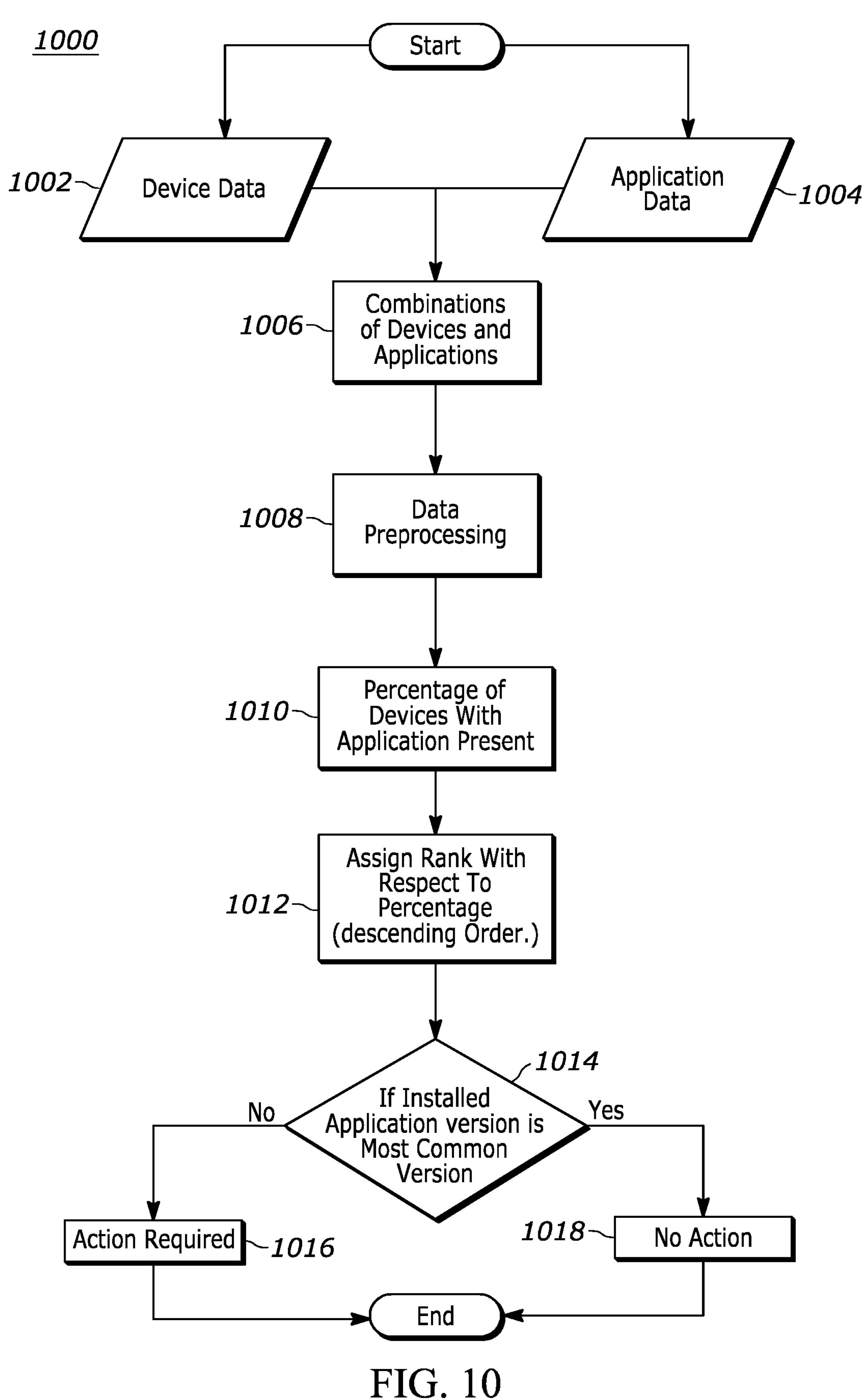
FIG. 10 is a flow diagram of an example process for implementing example methods and/or operations described herein including techniques for determining whether an application version on a given device is the desired/optimized version, or otherwise the most common version, or whether the application version on the device has been changed, as may be performed by the system of FIG. 1.

FIG. 10 is a flow diagram of an example process 1000 for implementing example methods and/or operations described herein including techniques for determining whether an application version on a given device is the desired/optimized version, or otherwise the most common version, or whether the application version on the device has been changed, as may be performed by the system of FIG. 1, as discussed with respect to Tables 20-22 below.

Table 20 illustrates versions of various applications 1004 and their versions for various devices 1002, listed by device model number and serial number.

TABLE 20

| Serial Number | Model | Raised Date | Application Name | Version |
|---|---|---|---|---|
| XXxxxxxxxx318 | XX72 | Apr. 20, 2022 | Settings | 10 |
| XXxxxxxxxx542 | XX75x | Apr. 20, 2022 | External Storage | 7.1.2 |
| XXxxxxxxxx927 | XX70x | Apr. 19, 2022 | Messaging | 8.1.0 |
| XXxxxxxxxx413 | XX70x | Apr. 20, 2022 | RFID Print | 3.0.11 |
| XXxxxxxxxx788 | XX70x | Apr. 20, 2022 | Google Services Framework | 8.1.0-6477825 |
| XXxxxxxxxx576 | XX70x | Apr. 20, 2022 | Work profile setup | 8.1.0 |

An algorithm may obtain each combination of application name and application version (1006) and may pre-process (1008) this data to determine the percentage (1010) of each combination of application name and application version associated with each model/product family. The method 1000 may include assigning a rank (1012) to each combination of application name and application version based on the percentage distribution. As shown at Table 21, for each model/product family logical grouping, the version of the application installed on the highest percentage of devices will be ranked highest.

TABLE 21

| Logical Grouping | Application Name | Version | Count of unique devices having the version | Total number of devices having the application | Percentage of devices having the version | Version Rank |
|---|---|---|---|---|---|---|
| 12XXX_XX75x | HTML Viewer | 7.1.2 | 628 | 658 | 95.44 | 1 |
| 12XXX_XX75x | HTML Viewer | 8.1.0 | 30 | 658 | 4.56 | 2 |
| 12XXX_XX8000 | HTML Viewer | 5.1.1-74 | 183 | 261 | 70.11 | 1 |
| 12XXX_XX8000 | HTML Viewer | 5.1.1-103 | 71 | 261 | 27.2 | 2 |
| 12XXX_XX8000 | HTML Viewer | 5.1.1-86 | 3 | 261 | 1.15 | 3 |
| 12XXX_XX8000 | HTML Viewer | 5.1.1-110 | 2 | 261 | 0.77 | 4 |
| 12XXX_XX8000 | HTML Viewer | 5.1.1-113 | 1 | 261 | 0.38 | 5 |
| 12XXX_XX8000 | HTML Viewer | 5.1.1-35 | 1 | 261 | 0.38 | 6 |
| 12XXX_XX6000 | HTML Viewer | 5.1.1-170616 | 75 | 75 | 100 | 1 |

Table 22 illustrates the ranking of application versions installed on particular devices, listed by serial number and logical grouping.

TABLE 22

| Serial Number | Logical Grouping | Application Name | Version installed on device | Rank of version installed on device | Percentage of devices having this version |
|---|---|---|---|---|---|
| XXxxxxxx794 | 1200001_XX75x | HTML Viewer | 7.1.2 | 1 | 95.44 |
| XXxxxxxx150 | 1200001_XX75x | HTML Viewer | 7.1.2 | 1 | 95.44 |
| XXxxxxxx920 | 1200001_XX75x | HTML Viewer | 8.1.0 | 2 | 4.56 |
| XXxxxxxx100 | 1200001_XX8000 | HTML Viewer | 5.1.1-74 | 1 | 70.11 |
| XXxxxxxx844 | 1200001_XX8000 | HTML Viewer | 5.1.1-103 | 2 | 27.2 |
| XXxxxxxxx913 | 1200001_XX8000 | HTML Viewer | 5.1.1-110 | 4 | 0.77 |
| XXxxxxxxx914 | 1200001_XX8000 | HTML Viewer | 5.1.1-74 | 1 | 70.11 |
| XXxxxxxxx052 | 1200001_XX6000 | HTML Viewer | 5.1.1-170616 | 1 | 100 |

If the installed application on a device is the most common version of the application for the same product family or model (1014, YES), no action is required. However, when a device has a different version of the application assigned than the most common version of the application for the same product family or model (1014, NO), a mismatch may be identified, and, if necessary, proactive measures (1016) may be taken, such as installing the most common version of the application.

Example Method

Figure 11:
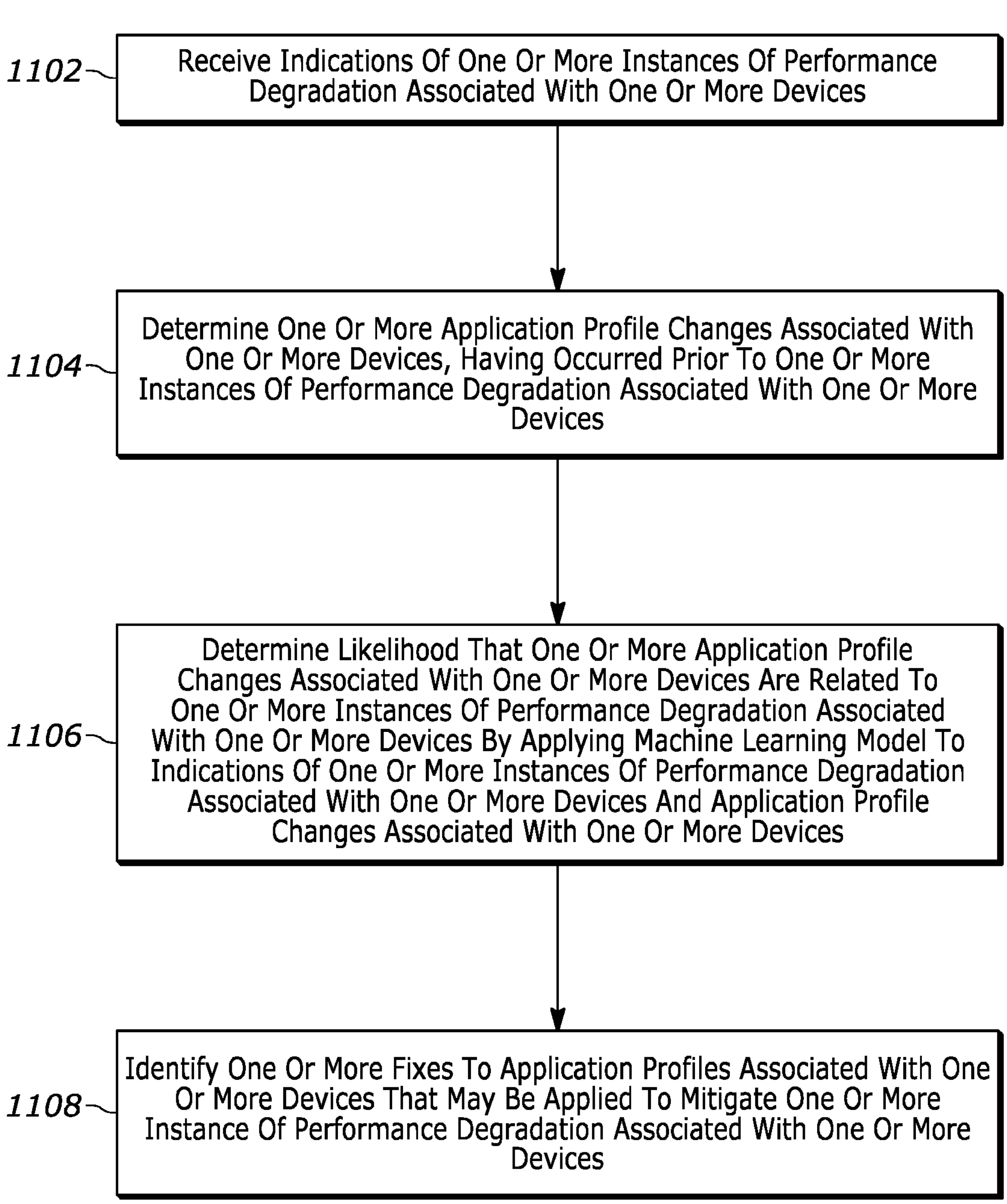
FIG. 11 is a flow diagram of an example process for implementing example methods and/or operations described herein including techniques for diagnosing instances of performance degradation related to application profile changes for devices in a logical group, as may be performed by the system of FIG. 1.

FIG. 11 illustrates a block diagram of an example process 1100 for implementing example methods and/or operations described herein including techniques for diagnosing instances of performance degradation that are related to application profile changes for devices in a logical group, as may be performed by the system 100 of FIG. 1.

At block 1102, indications of one or more instances of performance degradation associated with one or more devices may be received. In some examples, the one or more devices may each be part of the same logical group. Logical groups may be based on, for instance, a product type associated with the one or more devices; a function associated with the one or more devices or users thereof; a location site, or group of sites, associated with the one or more devices or users thereof; a number of devices at a location site associated with the one or more devices; a business function associated with the one or more devices within a location site; an organization associated with the one or more devices or users thereof, or any combination of the above.

Some examples of instances of performance degradation associated with the one or more devices may include excessive (e.g., greater than a threshold amount) or premature (e.g., occurring prior to a threshold amount of time) battery depletion associated with the device or associated with particular applications of a device; frequent (e.g., greater than a threshold amount) battery changes associated with a device; a device being reported to a repair center; a device returning an application error; an application of a device not responding to user requests; scan failures associated with a device; excessive (e.g., greater than a threshold amount) network usage associated with a device or associated with particular applications of a device; excessive (e.g., greater than a threshold amount) memory usage associated with a device or associated with particular applications of a device; excessive (e.g., greater than a threshold amount) user-generated reboots associated with a device; excessive (e.g., greater than a threshold amount) system-generated reboots associated with a device; excessive (e.g., greater than a threshold amount) processor utilization associated with the device; excessive (e.g., greater than a threshold amount) processor utilization associated with one or more applications of the device; or any combination of any of the above.

At block 1104, one or more application profile changes associated with the one or more devices, and having occurred prior to the one or more instances of performance degradation, may be determined. For instance, some examples of application profile changes may include: installing an application on a device; uninstalling an application from a device; disabling an application of a device; installing a particular update of an application of a device; or any combination of any of the above. In some examples, the determination may be a determination that the same one or more application profile changes were made to each of the devices in the logical group, and/or that the same one or more application profile changes were made to each of the devices in the logical group associated with instances of performance degradation.

At block 1106, a likelihood that the one or more application profile changes associated with the one or more devices are related to the one or more instances of performance degradation associated with the one or more devices may be determined, by applying a machine learning model to the indications of one or more instances of performance degradation associated with the one or more devices and the one or more application profile changes associated with the one or more devices. In some examples, the machine learning model may be a statistical model. Moreover, in some examples, the machine learning model may be a Monte Carlo model.

Furthermore, in some examples, the method 1100 may include training the machine learning model to determine a likelihood that one or more of the application profile changes associated with the one or more devices are related to the one or more instances of performance degradation associated with the one or more devices based on the received instances of performance degradation associated with the one or more devices, and the determined one or more application profile changes associated with the one or more devices. For instance, the machine learning model may be trained by analyzing training data including historical device log data associated with historical devices and historical instances of performance degradation associated with the historical devices, in order to identify one or more instance of performance degradation associated with one or more devices based on device data associated with the one or more device.

At block 1108, one or more fixes to the application profiles associated with the one or more devices, that may be applied to mitigate the one or more instances of performance degradation associated with the one or more devices, may be identified. Some examples of fixes to the application profiles associated with the one or more devices that may be applied to mitigate the one or more instances of performance degradation associated with the one or more devices may include: uninstalling an application that was installed on a device during the one or more application profile changes; installing an application that was uninstalled from a device during the one or more application profile changes; disabling an application that was installed on a device during the one or more application profile changes; installing a particular update of an application installed on a device during the one or more application profile changes; reverting an application installed on the device during the one or more application profile changes to a previous version, or any combination of any of the above. The fix that is identified by the method 1100 may be based, at least in part, on whether the one or more application profile changes determined to be related to the one or more instances of performance degradation relate to an essential application or a non-essential application. For instance, determining whether the one or more application profile changes relate to an essential application or a non-essential application may be based on analyzing descriptions of the application from an application store using one or more semantic rules or keyword searches, and/or based on a database or lookup table listing various applications as either "essential" or "non-essential."

For instance, in some examples, identifying the one or more fixes to the application profiles associated with the one or more devices that may be applied to mitigate the one or more instances of performance degradation associated with the one or more devices may include includes applying the machine learning model discussed above (or a different machine learning model) in order to identify the one or more fixes to the application profiles associated with the one or more devices that may be applied to mitigate the one or more instances of performance degradation associated with the one or more devices. For instance, the machine learning model may be trained by analyzing training data including historical application profile changes associated with historical devices, historical instances of performance degradation associated with the historical devices, historical fixes applied to the historical devices, and historical rates of success associated with the historical fixes applied to the historical devices, in order to identify one or more fixes to the application profiles associated with the one or more devices that may be applied in order to mitigate the one or more instances of performance degradation associated with the one or more devices.

Additionally, in some examples, the method 1100 may include applying the one or more identified fixes to the application profiles associated with the one or more devices in order to mitigate the one or more instances of performance degradation associated with the one or more devices.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method, comprising:

receiving, by one or more processors, indications of one or more instances of performance degradation associated with one or more devices;

determining, by the one or more processors, one or more application profile changes associated with the one or more devices, the one or more application profile changes having occurred prior to the one or more instances of performance degradation;

determining, by the one or more processors, a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identifying, by the one or more processors, one or more fixes to the application profiles associated with the one or more devices that may be applied to mitigate the one or more instances of performance degradation associated with the one or more devices, the one or more application profiles being indicative of essential and non-essential applications installed on the one or more devices.

2. The method of claim 1, wherein the machine learning model is one of a statistical model or a Monte Carlo model.

3. The method of claim 1, wherein the machine learning model is one of a supervised model or an unsupervised model.

4. The method of claim 1, further comprising:

training, by the one or more processors, the model to determine a likelihood that one or more of the application profile changes associated with the one or more devices are related to the one or more instances of performance degradation associated with the one or more devices based on the received instances of performance degradation associated with the one or more devices, and the determined one or more application profile changes associated with the one or more devices.

5. The method of claim 4, wherein the machine learning model is trained by analyzing training data including historical device log data associated with historical devices and historical instances of performance degradation associated with the historical devices, in order to identify one or more instance of performance degradation associated with one or more devices based on device data associated with the one or more device.

6. The method of claim 1, wherein identifying, by the one or more processors, the one or more fixes to the application profiles associated with the one or more devices that may be applied to mitigate the one or more instances of performance degradation associated with the one or more devices includes applying the model executing on the one or more processors in order to identify the one or more fixes to the application profiles associated with the one or more devices that may be applied to mitigate the one or more instances of performance degradation associated with the one or more devices.

7. The method of claim 6, wherein the model is trained by analyzing training data including historical application profile changes associated with historical devices, historical instances of performance degradation associated with the historical devices, historical fixes applied to the historical devices, and historical rates of success associated with the historical fixes applied to the historical devices, in order to identify one or more fixes to the application profiles associated with the one or more devices that may be applied in order to mitigate the one or more instances of performance degradation associated with the one or more devices.

8. The method of claim 1, further comprising:

applying, by the one or more processors, the one or more identified fixes to the application profiles associated with the one or more devices to mitigate the one or more instances of performance degradation associated with the one or more devices.

9. The method of claim 1, wherein the one or more instances of performance degradation include one or more of:

(i) excessive or premature battery depletion associated with the device or associated with particular applications of the device;
(ii) frequent battery changes associated with the device;
(iii) the device being reported to a repair center;
(iv) the device returning an application error;
(vi) an application of the device not responding to user requests;
(vii) scan failures associated with the device;
(viii) excessive network usage associated with the device or associated with particular applications of the device;
(ix) excessive memory usage associated with the device or associated with particular applications of the device;
(x) excessive user-generated reboots associated with the device;
(xi) excessive system-generated reboots associated with the device;
(xii) excessive processor utilization associated with the device; or
(xiii) excessive processor utilization associated with one or more applications of the device.

10. The method of claim 1, wherein the one or more application profile changes include one or more of:

(i) installing an application on the device;
(ii) uninstalling an application from the device;
(iii) disabling an application of the device; or
(iv) installing a particular update of an application of the device.

11. The method of claim 1, wherein the one or more identified fixes to the application profiles associated with the one or more devices that may be applied to mitigate the one or more instances of performance degradation associated with the one or more devices include one or more of:

(i) uninstalling an application that was installed on the device during the one or more application profile changes;
(ii) installing an application that was uninstalled from the device during the one or more application profile changes;
(iii) disabling an application that was installed on the device during the one or more application profile changes;
(iv) installing a particular update of an application installed on the device during the one or more application profile changes; or
(v) reverting an application installed on the device during the one or more application profile changes to a previous version.

12. The method of claim 1, wherein the one or more fixes to the application profiles associated with the one or more devices that may be applied to mitigate the one or more instances of performance degradation associated with the one or more devices are identified based at least in part on whether the one or more application profile changes relate to an essential application or a non-essential application.

13. The method of claim 12, further comprising:

determining, by the one or more processors, whether the one or more application profile changes relate to an essential application or a non-essential application by analyzing descriptions of the application from an application store using one or more semantic rules or keyword searches.

14. The method of claim 1, wherein the one or more devices are each included in a logical group based one or more of: a product type associated with the one or more devices, a function associated with the one or more devices or users thereof, a location site, or group of sites, associated with the one or more devices or users thereof, a number of devices at a location site associated with the one or more devices, a business function associated with the one or more devices within a location site, or an organization associated with the one or more devices or users thereof.

15. A system, comprising:

one or more processors, and a memory storing computer-readable instructions that, when executed by the one or more processors, cause the one or more processors to:

receive indications of one or more instances of performance degradation associated with one or more devices;

determine one or more application profile changes associated with the one or more devices, the one or more application profile changes having occurred prior to the one or more instances of performance degradation;

determine a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identify one or more fixes to the application profiles associated with the one or more devices that may be applied to mitigate the one or more instances of performance degradation associated with the one or more devices, the one or more application profiles being indicative of essential and non-essential applications installed on the one or more devices.

16. The system of claim 15, wherein the machine learning model is one of a statistical model or a Monte Carlo model.

17. The system of claim 15, wherein the machine learning model is one of a supervised model or an unsupervised model.

18. The system of claim 15, wherein the instructions, when executed by the one or more processors, further cause the one or more processors to:

train the model to determine a likelihood that one or more of the application profile changes associated with the one or more devices are related to the one or more instances of performance degradation associated with the one or more devices based on the received instances of performance degradation associated with the one or more devices, and the determined one or more application profile changes associated with the one or more devices.

19. The system of claim 18, wherein the machine learning model is trained by analyzing training data including historical device log data associated with historical devices and historical instances of performance degradation associated with the historical devices, in order to identify one or more instance of performance degradation associated with one or more devices based on device data associated with the one or more device.

20. The system of claim 15, wherein identifying, by the one or more processors, the one or more fixes to the application profiles associated with the one or more devices that may be applied to mitigate the one or more instances of performance degradation associated with the one or more devices includes applying the model executing on the one or more processors in order to identify the one or more fixes to the application profiles associated with the one or more devices that may be applied to mitigate the one or more instances of performance degradation associated with the one or more devices.

21. The system of claim 20, wherein the model is trained by analyzing training data including historical application profile changes associated with historical devices, historical instances of performance degradation associated with the historical devices, historical fixes applied to the historical devices, and historical rates of success associated with the historical fixes applied to the historical devices, in order to identify one or more fixes to the application profiles associated with the one or more devices that may be applied in order to mitigate the one or more instances of performance degradation associated with the one or more devices.

22. The system of claim 15, wherein the instructions, when executed by the one or more processors, further cause the one or more processors to:

apply the one or more identified fixes to the application profiles associated with the one or more devices to mitigate the one or more instances of performance degradation associated with the one or more devices.

23. The system of claim 15, wherein the one or more instances of performance degradation include one or more of:

(i) excessive or premature battery depletion associated with the device or associated with particular applications of the device;

(ii) frequent battery changes associated with the device;

(iii) the device being reported to a repair center;

(iv) the device returning an application error;

(vi) an application of the device not responding to user requests;

(vii) scan failures associated with the device;

(viii) excessive network usage associated with the device or associated with particular applications of the device;

(ix) excessive memory usage associated with the device or associated with particular applications of the device;

(x) excessive user-generated reboots associated with the device;

(xi) excessive system-generated reboots associated with the device;

(xii) excessive processor utilization associated with the device; or (xiii) excessive processor utilization associated with one or more applications of the device.

24. The system of claim 15, wherein the one or more application profile changes include one or more of:

(i) installing an application on the device;

(ii) uninstalling an application from the device;

(iii) disabling an application of the device; or (iv) installing a particular update of an application of the device.

25. The system of claim 15, wherein the one or more identified fixes to the application profiles associated with the one or more devices that may be applied to mitigate the one or more instances of performance degradation associated with the one or more devices include one or more of:

(i) uninstalling an application that was installed on the device during the one or more application profile changes;

(ii) installing an application that was uninstalled from the device during the one or more application profile changes;

(iii) disabling an application that was installed on the device during the one or more application profile changes;

(iv) installing a particular update of an application installed on the device during the one or more application profile changes; or (v) reverting an application installed on the device during the one or more application profile changes to a previous version.

26. The system of claim 15, wherein the one or more fixes to the application profiles associated with the one or more devices that may be applied to mitigate the one or more instances of performance degradation associated with the one or more devices are identified based at least in part on whether the one or more application profile changes relate to an essential application or a non-essential application.

27. The system of claim 26, wherein the instructions, when executed by the one or more processors, further cause the one or more processors to:

determine whether the one or more application profile changes relate to an essential application or a non-essential application by analyzing descriptions of the application from an application store using one or more semantic rules or keyword searches.

28. The system of claim 15, wherein the one or more devices are each included in a logical group based one or more of: a product type associated with the one or more devices, a function associated with the one or more devices or users thereof, a location site, or group of sites, associated with the one or more devices or users thereof, a number of devices at a location site associated with the one or more devices, a business function associated with the one or more devices within a location site, or an organization associated with the one or more devices or users thereof.

29. A non-transitory, computer-readable medium storing instructions that, when executed by one or more processors, cause the one or more processors to:

receive indications of one or more instances of performance degradation associated with one or more devices;

determine one or more application profile changes associated with the one or more devices, the one or more application profile changes having occurred prior to the one or more instances of performance degradation;

determine a likelihood that the one or more application profile changes associated with the one or more devices are related to the one or more instances of performance degradation associated with the one or more devices by applying a machine learning model executing on the one or more processors to the indications of one or more instances of performance degradation associated with the one or more devices and the one or more application profile changes associated with the one or more devices; and identify one or more fixes to the application profiles associated with the one or more devices that may be applied to mitigate the one or more instances of performance degradation associated with the one or more devices, the one or more application profiles being indicative of essential and non-essential applications installed on the one or more devices.

30. The non-transitory, computer-readable medium of claim 29, wherein the machine learning model is one of a statistical model or a Monte Carlo model.

31. The non-transitory, computer-readable medium of claim 29, wherein the machine learning model is one of a supervised model or an unsupervised model.

32. The non-transitory, computer-readable medium of claim 29, wherein the instructions, when executed by the one or more processors, further cause the one or more processors to:

train the model to determine a likelihood that one or more of the application profile changes associated with the one or more devices are related to the one or more instances of performance degradation associated with the one or more devices based on the received instances of performance degradation associated with the one or more devices, and the determined one or more application profile changes associated with the one or more devices.

33. The non-transitory, computer-readable medium of claim 32, wherein the machine learning model is trained by analyzing training data including historical device log data associated with historical devices and historical instances of performance degradation associated with the historical devices, in order to identify one or more instance of performance degradation associated with one or more devices based on device data associated with the one or more device.

34. The non-transitory, computer-readable medium of claim 29, wherein identifying, by the one or more processors, the one or more fixes to the application profiles associated with the one or more devices that may be applied to mitigate the one or more instances of performance degradation associated with the one or more devices includes applying the model executing on the one or more processors in order to identify the one or more fixes to the application profiles associated with the one or more devices that may be applied to mitigate the one or more instances of performance degradation associated with the one or more devices.

35. The non-transitory, computer-readable medium of claim 34, wherein the model is trained by analyzing training data including historical application profile changes associated with historical devices, historical instances of performance degradation associated with the historical devices, historical fixes applied to the historical devices, and historical rates of success associated with the historical fixes applied to the historical devices, in order to identify one or more fixes to the application profiles associated with the one or more devices that may be applied in order to mitigate the one or more instances of performance degradation associated with the one or more devices.

36. The non-transitory, computer-readable medium of claim 29, wherein the instructions, when executed by the one or more processors, further cause the one or more processors to:

apply the one or more identified fixes to the application profiles associated with the one or more devices to mitigate the one or more instances of performance degradation associated with the one or more devices.

37. The non-transitory, computer-readable medium of claim 29, wherein the one or more instances of performance degradation include one or more of:

(i) excessive or premature battery depletion associated with the device or associated with particular applications of the device;
(ii) frequent battery changes associated with the device;
(iii) the device being reported to a repair center;
(iv) the device returning an application error;
(vi) an application of the device not responding to user requests;
(vii) scan failures associated with the device;
(viii) excessive network usage associated with the device or associated with particular applications of the device;
(ix) excessive memory usage associated with the device or associated with particular applications of the device;
(x) excessive user-generated reboots associated with the device;
(xi) excessive system-generated reboots associated with the device;
(xii) excessive processor utilization associated with the device; or
(xiii) excessive processor utilization associated with one or more applications of the device.

38. The non-transitory, computer-readable medium of claim 29, wherein the one or more application profile changes include one or more of:

(i) installing an application on the device;
(ii) uninstalling an application from the device;
(iii) disabling an application of the device; or
(iv) installing a particular update of an application of the device.

39. The non-transitory, computer-readable medium of claim 29, wherein the one or more identified fixes to the application profiles associated with the one or more devices that may be applied to mitigate the one or more instances of performance degradation associated with the one or more devices include one or more of:

(i) uninstalling an application that was installed on the device during the one or more application profile changes;
(ii) installing an application that was uninstalled from the device during the one or more application profile changes;
(iii) disabling an application that was installed on the device during the one or more application profile changes;
(iv) installing a particular update of an application installed on the device during the one or more application profile changes; or
(v) reverting an application installed on the device during the one or more application profile changes to a previous version.

40. The non-transitory, computer-readable medium of claim 29, wherein the one or more fixes to the application profiles associated with the one or more devices that may be applied to mitigate the one or more instances of performance degradation associated with the one or more devices are identified based at least in part on whether the one or more application profile changes relate to an essential application or a non-essential application.

41. The non-transitory, computer-readable medium of claim 40, wherein the instructions, when executed by the one or more processors, further cause the one or more processors to:

determine whether the one or more application profile changes relate to an essential application or a non-essential application by analyzing descriptions of the application from an application store using one or more semantic rules or keyword searches.

42. The non-transitory, computer-readable medium of claim 29, wherein the one or more devices are each included in a logical group based one or more of: a product type associated with the one or more devices, a function associated with the one or more devices or users thereof, a location site, or group of sites, associated with the one or more devices or users thereof, a number of devices at a location site associated with the one or more devices, a business function associated with the one or more devices within a location site, or an organization associated with the one or more devices or users thereof.

* * * * *